(12) United States Patent
Kato et al.

(10) Patent No.: US 8,995,578 B2
(45) Date of Patent: Mar. 31, 2015

(54) RECEIVER APPARATUS, RECEPTION METHOD, AND RECEPTION PROGRAM

(75) Inventors: Katsuya Kato, Osaka (JP); Takashi Yoshimoto, Osaka (JP); Ryota Yamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/876,500

(22) PCT Filed: Aug. 10, 2011

(86) PCT No.: PCT/JP2011/068224
§ 371 (c)(1),
(2), (4) Date: Mar. 28, 2013

(87) PCT Pub. No.: WO2012/043072
PCT Pub. Date: Apr. 5, 2012

(65) Prior Publication Data
US 2013/0182802 A1    Jul. 18, 2013

(30) Foreign Application Priority Data

Sep. 29, 2010   (JP) .................................. 2010-218988

(51) Int. Cl.
*H04L 27/06* (2006.01)
*H04L 25/02* (2006.01)
(Continued)

(52) U.S. Cl.
CPC .......... *H04L 25/0212* (2013.01); *H04L 5/0048* (2013.01); *H04L 25/0226* (2013.01); *H04L 25/025* (2013.01); *H04J 11/0063* (2013.01); *H04L 5/0007* (2013.01); *H04L 25/0256* (2013.01)

USPC ........... 375/340; 375/316; 375/219; 375/285; 375/141; 375/147; 375/152; 375/143; 375/322; 370/203; 370/208

(58) Field of Classification Search
USPC ......... 375/340, 316, 219, 148, 285, 141, 147, 375/152, 143, 322; 370/203, 208
See application file for complete search history.

(56) References Cited

U.S. PATENT DOCUMENTS

| | | | |
|---|---|---|---|
| 2005/0047488 A1* | 3/2005 | Sugahara ...................... | 375/148 |
| 2005/0058183 A1* | 3/2005 | Ogawa et al. ................. | 375/148 |
| 2010/0128807 A1* | 5/2010 | Hyung-Jin et al. ........... | 375/260 |

FOREIGN PATENT DOCUMENTS

| | | |
|---|---|---|
| JP | 2000-244445 A | 9/2000 |
| JP | 2002-527997 A | 8/2002 |

(Continued)

OTHER PUBLICATIONS

International Preliminary Report on Patentability and Written Opinion of the International Searching Authority, issued in PCT/JP2011/068224, mailed Apr. 18, 2013.

(Continued)

*Primary Examiner* — Zewdu Kassa
(74) *Attorney, Agent, or Firm* — Birch, Stewart, Kolasch & Birch, LLP

(57) ABSTRACT

A receiver apparatus includes a propagation channel estimating unit that estimates a propagation channel. The propagation channel estimating unit includes a path detector unit that repeatedly performs a process of detecting paths in the order of increase in a propagation channel goodness of fit. The receiver apparatus that estimates a propagation channel at a high accuracy level with a small amount of calculation operation involved is thus provided.

15 Claims, 19 Drawing Sheets

(51) Int. Cl.
*H04L 5/00* (2006.01)
*H04J 11/00* (2006.01)

(56) References Cited

FOREIGN PATENT DOCUMENTS

| JP | 2008-113240 A | 5/2008 |
| JP | 2009-188878 A | 8/2009 |
| WO | WO 00/22791 A | 4/2000 |

OTHER PUBLICATIONS

International Search Report, mailed Sep. 13, 2011, issued in PCT/JP2011/068224.
Kato et al., "Iterative Detection and Channel Estimation Employing Adaptive Tap Selection for Scattered Pilot OFDM Receiver", The Institute of Electronics, Information and Communication Engineers, IEICE Technical Report, RCS2006-76, pp. 103-108, Jul. 2006.
Written Opinion of the International Searching Authority, mailed Sep. 13, 2011, issued in PCT/JP2011/068224.

* cited by examiner

RECEIVER APPARATUS, RECEPTION METHOD, AND RECEPTION PROGRAM

TECHNICAL FIELD

The present invention relates to a receiver apparatus, a reception method, and a reception program.

BACKGROUND ART

There are present in wireless communications, particularly, in wideband transmission, not only a path through which a signal arrives early but also a path through which a signal arrives with a delay involved as a result of reflection on obstacles including buildings and mountains. An environment in which multi-paths are present is referred to as a multi-path environment. For example, if a receiver apparatus performs a demodulation process on a received signal in a time domain, a channel impulse response is needed as a propagation channel in the time domain. If the receiver apparatus performs the demodulation process on the received signal in a frequency domain, a frequency response as a propagation channel in the frequency domain is needed. A method of transmitting a pilot signal from a transmitter apparatus to a receiver apparatus is available so that the receiver apparatus beforehand stores an amplitude value of a waveform (or a signal string) of the pilot signal to estimate the propagation channel. Statistical properties of the propagation channel, such power of a delay path, need to be known to obtain a high-accuracy propagation channel estimated value.

Non-Patent Literature 1 listed below describes a technique of reducing the effect of noise and interference and improving an estimation accuracy by selecting paths to be estimated in scattered pilot OFDM (Orthogonal Frequency Division Multiplexing). More specifically, in accordance with Non-Patent Literature 1, paths of high power are extracted from among channel impulse response that is approximated by performing IFFT (Inverse Fast Fourier Transform) to estimated values of frequency response, and a delay time corresponding to the path is used as a delay time of tap for use in estimation.

However, if the number of estimated frequency response is limited, this method causes an approximate channel impulse response obtained through IFFT to be spread in position from where the path is originally expected. In such a case, an increase in the estimation accuracy is subject to limitations because delay times that are around a path to be estimated and does not contribute to any increase in the estimation accuracy are also selected.

FIG. 1 illustrates a transmission model that is free from path spreading. The abscissa represents delay time and the ordinate represents power of path. There exist two paths, path 101 and path 102. Since paths having power above a threshold value 103 are selected, path 101 and path 102 are selected.

On the other hand, FIG. 2 illustrates spread paths. Path 101, path 102, and threshold value 103 are identical to those illustrated in FIG. 1. A spreading 201 of the path 101 and a spreading 202 of the path 102 cause paths 203 through 206 to be selected as paths above the threshold value that are redundant.

On the other hand, Patent Literature 1 listed below describes a technique in which an estimated value is calculated in accordance with a plurality of channel model structures and an optimum channel model structure is selected in terms of a separation or other factor between an estimated evaluation value and a received signal. Since this technique selects paths based on statistical information criterion rather than power, the problem of Non-Patent Literature 1 is reduced.

CITATION LIST

Patent Literature

PTL 1: Japanese Unexamined Patent Application Publication No. 2002-527997

Non Patent Literature

NPL 1: KATO, SUYAMA, SUZUKI, FUKAWA, "Scattered pilot OFDM receiver with iterative detection and channel estimation employing adaptive tap selection," Institute of Electronics, Information and Communication Engineers transaction RCS2006-76, July 2006

SUMMARY OF INVENTION

Technical Problem

Since broadband resulting from recent wireless communication techniques increases the number of effective paths observed by a receiver apparatus, the technique disclosed in Patent Literature 1 substantially increases an amount of calculation involved.

The present invention has been developed under these circumstances, and the object of the invention is to provide a receiver apparatus that estimates a propagation channel at a high accuracy level with a small amount of calculation operation involved.

Solution to Problem

In one aspect of the present invention, there is provided a receiver apparatus including a propagation channel estimating unit that estimates a propagation channel. The propagation channel estimating unit includes a path detector unit that repeatedly performs a process of detecting paths in the order of increase in a propagation channel goodness of fit.

The path detector unit preferably repeatedly performs the process of detecting paths until any path that provides an increased propagation channel goodness of fit is no longer present. The path detector unit preferably detects paths one by one. The path detector unit may further perform a process of deleting from candidates a path that does not increases the propagation channel goodness of fit. The path detector unit preferably uses as the propagation channel goodness of fit a sum of a propagation channel estimated value, an evaluation value of an error of a received signal, and a penalty responsive to an increase in the number of detected paths.

The path detector unit preferably calculates the propagation channel goodness of fit based on a physical structure of a reference signal that is used to calculate the propagation channel estimated value.

The physical structure is preferably an assignment frequency. The physical structure is preferably a wave shape in time.

The path detector unit may use the Akaike information criterion as the propagation channel goodness of fit. The path detector unit may use the Bayesian information criterion as the propagation channel goodness of fit.

The receiver apparatus preferably includes a path information external input and propagation channel estimating unit that uses, as external information, detected path information.

The path detector unit outputs the path information to the path information external input and propagation channel estimating unit. The path information external input and propagation channel estimating unit preferably estimates a propagation channel in a frequency domain. The path information external input and propagation channel estimating unit preferably estimates a propagation channel in a time domain.

In another aspect of the present invention, there is provided a reception method including a propagation channel estimating step of estimating a propagation channel. The propagation channel estimating step includes repeatedly performing a process of detecting paths in the order of increase in a propagation channel goodness of fit until any path that provides an increased propagation channel goodness of fit is no longer present.

The present invention may be the reception program for causing a computer to perform the reception method, or may be a computer readable recording medium that has recorded the program.

The specification of this invention includes the contents included in the specification and/or the drawings of Japanese Unexamined Patent Application Publication No. 2010-218988 on which the priority right claimed in this application is based.

Advantageous Effects of Invention

According to the present invention, an amount of calculation operation involved in the propagation channel estimation is substantially reduced.

DESCRIPTION OF EMBODIMENTS

First Embodiment

Figure 1:
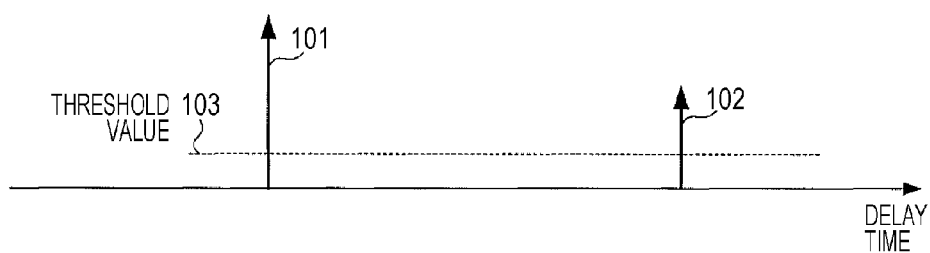
FIG. 1 illustrates an example of a propagation model with paths having no spreading, wherein the abscissa represents delay time and the ordinate represents powers of the paths.
Figure 2:
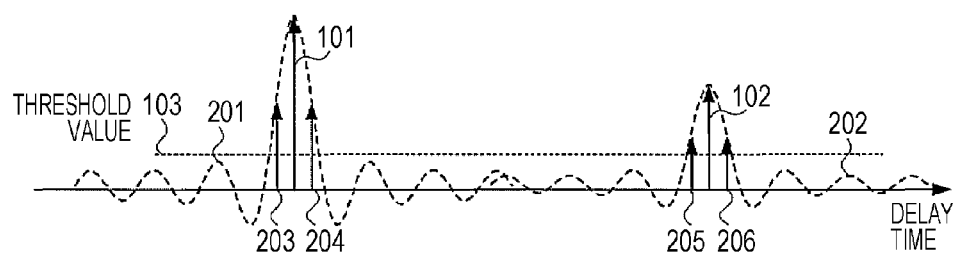
FIG. 2 illustrates an example of a propagation model with paths having spreading, wherein the abscissa represents the delay time and the ordinate represents the powers of the paths.
Figure 3:
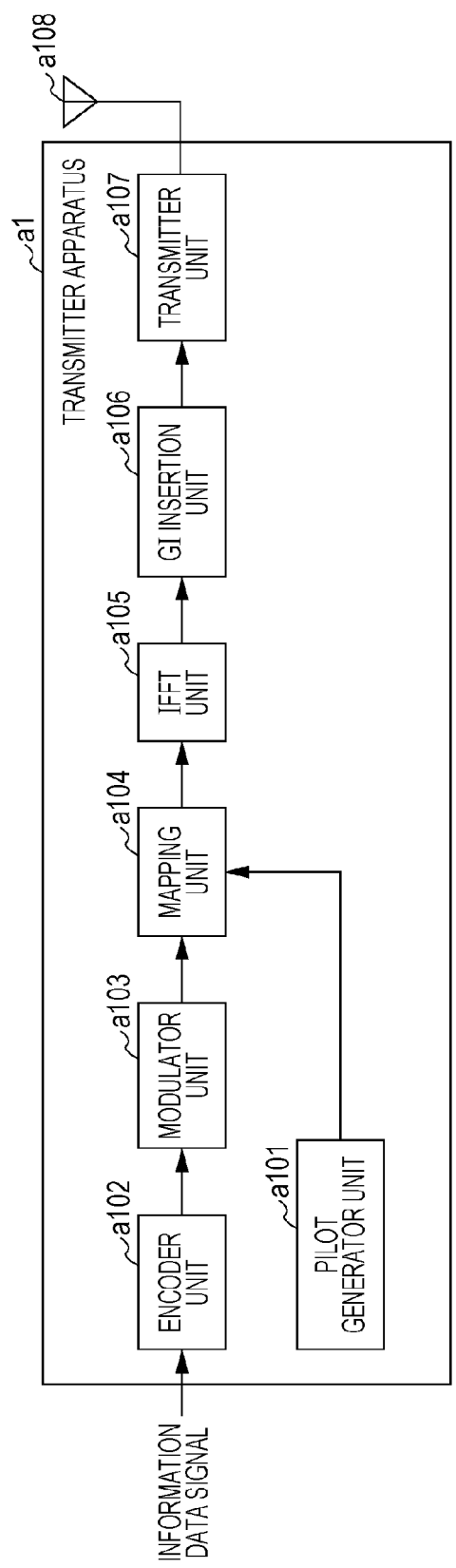
FIG. 3 is a general block diagram of a transmitter apparatus of a first embodiment of the present invention.

FIG. 3 is a general block diagram of a transmitter apparatus of a first embodiment of the present invention. In the following discussion, the transmitter apparatus is designated with a reference symbol a1. As illustrated in FIG. 1, the transmitter apparatus a1 includes a pilot generator unit a101, an encoder unit a102, a modulator unit a103, a mapping unit a104, an IFFT unit a105, a GI insertion unit a106, a transmitter unit a107, and a transmitting antenna unit a108. The transmitter apparatus a1 transmits an OFDM signal.

The pilot generator unit a101 generates a pilot symbol and outputs the pilot symbol to the mapping unit a104. An amplitude value of a waveform (or a signal sequence) of the pilot signal is stored beforehand in the pilot symbol. In the following discussion, the receiver apparatus is designated with a reference symbol b1. The receiver apparatus b1 performs a propagation channel estimation using the pilot symbol as a reference signal.

The encoder unit a102 encodes information bit to be transmitted to the receiver apparatus b1 using error correction code such as convolution code, turbo code, or LDPC (Low Density Parity Check) code. The encoder unit a102 thus generates an encoded bit. The encoder unit a102 outputs the generated encoded bit to the modulator unit a103.

The modulator unit a103 modulates the encoded bit input from the encoder unit a102 using a modulation method such as PSK (Phase Shift Keying) or QAM (Quadrature amplitude modulation). The modulator unit a103 thus generates a modulated symbol. The modulator unit a103 then outputs the modulated symbol to the mapping unit a104.

The mapping unit a104 maps the pilot symbol input from the pilot generator unit a101 and the modulated symbol input from the modulator unit a103 to a resource (time-frequency band) in accordance with predetermined mapping information.

The mapping unit a104 thus generates a signal in a frequency domain, and then outputs the generated signal in the frequency domain to the IFFT unit a105. The resource refers to a unit according to which the modulated symbol inclusive of one subcarrier and one FFT period to be discussed below is arranged in a frame that the transmitter apparatus a1 is to transmit. The mapping information is determined by the transmitter apparatus a1 and the transmitter apparatus a1 notifies the receiver apparatus b1 of the mapping information in advance.

Figure 4:
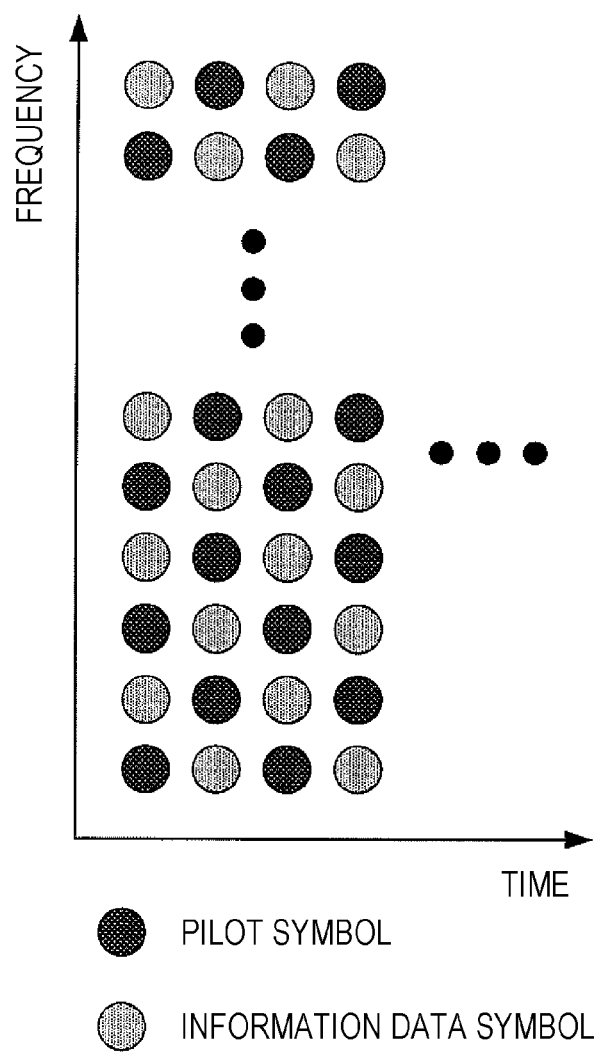
FIG. 4 illustrates a mapping example in which a mapping unit a104 maps pilot symbols to modulation signals.

FIG. 4 illustrates a mapping example in which the mapping unit a104 maps the pilot symbol to the modulated signal.

The IFFT unit a105 of FIG. 3 frequency-time transforms the signal in the frequency domain input from the mapping unit a104, thereby generating a signal in the time domain. A unit of time period of IFFT is referred to as an FFT period. The IFFT unit a105 outputs the generated signal in the time domain to the GI insertion unit a106.

The GI insertion unit a106 attaches a guard interval (GI) to each signal in the time domain input from the IFFT unit a105 in the FFT period. The guard interval refers to a known signal, such as a cyclic prefix (CP) that is a copy of a trailing portion of the signal in the FFT period, or zero padding having consecutive zero segments, or Golay code. The GI insertion unit a106 attaches such a signal at the front end of the signal in the FFT period.

The combination of the FFT period and a time period of the guard interval attached to the signal during the corresponding time period by the GI insertion unit a106 (referred to as a GI period) is collectively referred to as an OFDM symbol period. A signal during the OFDM symbol period is referred to an OFDM symbol. The GI insertion unit a106 outputs the signal having the guard interval attached thereto to the transmitter unit a107.

The guard interval may be inserted into the trailing portion of the FFT period. For example, if the cyclic prefix is used, a copy of part of the leading portion of the FFT period is attached to the back end of the signal in the FFT period. In the case of the cyclic prefix, the periodicity of the OFDM symbol period is maintained, and this condition is not applied to other signals.

The transmitter unit a107 digital-to-analog converts the signal input from the GI insertion unit a106, and waveform-shapes a resulting analog signal. The transmitter unit a107 up-converts a waveform-shaped signal from a baseband to a radio-frequency band, and then transmits a resulting signal to a receiver apparatus b1 (FIG. 5) via the transmitting antenna unit a108.

Figure 5:
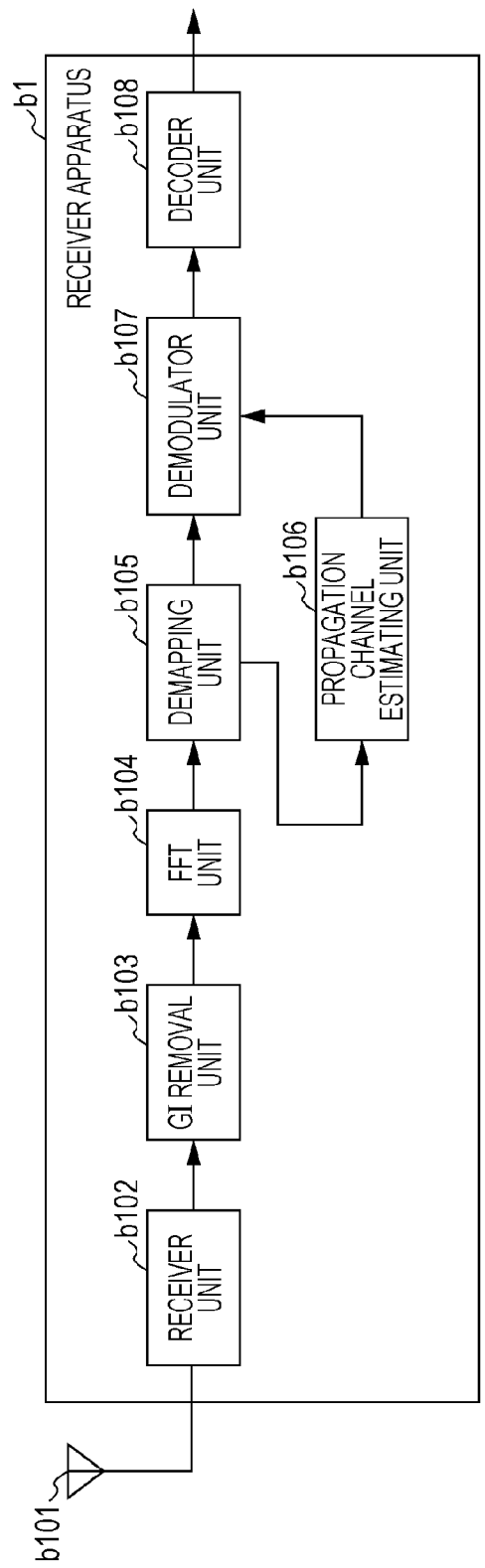
FIG. 5 is a general block diagram illustrating the structure of a receiver apparatus b1 of the present embodiment.

FIG. 5 is a general block diagram illustrating the structure of the receiver apparatus b1 of the present embodiment. As illustrated in this figure, the receiver apparatus b1 includes a receiving antenna unit b101, a receiver unit b102, a GI removal unit b103, an FFT unit b104, a demapping unit b105, a propagation channel estimating unit b106, a demodulator unit b107, and a decoder unit b108.

The receiver unit b102 receives a signal transmitted by the transmitter apparatus a1 via the receiving antenna unit b101. The receiver unit b102 frequency-converts and analog-to-digital converts the received signal.

The GI removal unit b103 removes the guard interval from the received signal input via the receiver unit b102, and then outputs a resulting signal to the FFT unit b104.

The FFT unit b104 performs time-frequency transformation to the signal in the time domain input from the GI removal unit b103, and outputs the converted signal in the frequency domain to the demapping unit b105.

The demapping unit b105 demaps the signal in accordance with mapping information provided by the transmitter apparatus a1 in advance, and then outputs to the propagation channel estimating unit b106 the received signal of a subcarrier over which a detached pilot symbol has been transmitted. Also, the demapping unit b105 outputs to the demodulator unit b107 the received signal of a subcarrier over which data has been transmitted.

Figure 6:
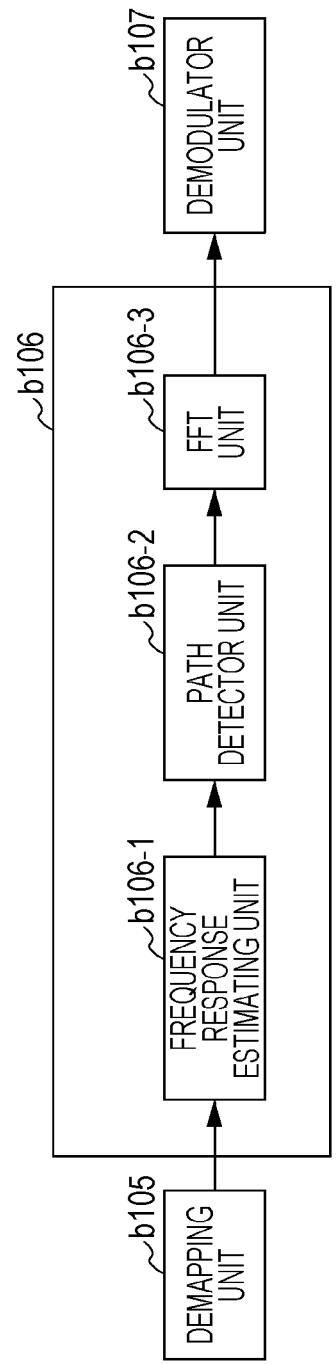
FIG. 6 is a general block diagram illustrating the structure of a propagation channel estimating unit b106.

FIG. 6 is a general block diagram illustrating the structure of the propagation channel estimating unit b106. As illustrated in this figure, the propagation channel estimating unit b106 includes a frequency response estimating unit b106-1, a path detector unit b106-2, and an FFT unit b106-3 in the order from the side of the demapping unit b105.

The frequency response estimating unit b106-1 estimates a frequency response based on the received signal input from the demapping unit b105 and the pre-stored pilot symbol, and then outputs the estimated frequency response to the path detector unit b106-2.

The path detector unit b106-2 detects paths one by one that increase propagation channel goodness of fit within a range up to assumed maximum delay time L. The propagation channel goodness of fit refers to a quantity that indicates a goodness of fit between a calculated estimated value and observed data (the received signal here). The path detector unit b106-2 concurrently estimates a channel impulse response. The path detector unit b106-2 selects a path in the order from high propagation channel goodness of fit to low propagation channel goodness of fit. At the same time, the path detector unit b106-2 deletes from candidates a path that does not increase the propagation channel goodness of fit. The principle of this operation is described below.

The path detector unit b106-2 ends the process thereof when any path that increases the propagation channel goodness of fit is no long present, and outputs an estimated value of the channel impulse response to the FFT unit b106-3.

The assumed maximum delay time L may simply be set to be longer than a maximum delay time of an actual propagation channel, and may have a margin that accommodates conditions under a variety of environments. To this end, detailed field studies may be performed to determine the assumed maximum delay time L before starting the operation of the communication system. The assumed maximum delay time L may be set to variable at a design stage of the communication system, and may then be updated when firmware and software of the receiver apparatus b1 are updated. Alternatively, the assumed maximum delay time L is left undetermined, and then estimated in the same manner as the propagation channel.

The propagation channel goodness of fit may be calculated using a physical structure of a reference signal that is used to estimate the channel impulse response. This operation is applicable not only to the present embodiment but also other embodiments. The principle of the operation is described below.

The FFT unit b106-3 performs time-frequency transforms the channel impulse response input from the path detector unit b106-2, and then outputs a resulting signal to the demodulator unit b107.

Using a pre-stored pilot symbol, the propagation channel estimating unit b106 measures noise power in a subcarrier over which a pilot symbol is conveyed (the subcarrier is referred to as a pilot subcarrier). A specific calculation method is described below together with the operation principle.

In response to the frequency response and the noise power input from the propagation channel estimating unit b106, the demodulator unit b107 calculates filter coefficients, such as ZF (Zero Forcing) criterion, MMSE (Minimum Mean. Square Error), and the like. Using the calculated filter coefficient, the demodulator unit b107 compensates for variations in the amplitude and phase of a signal (propagation channel compensation).

The demodulator unit b107 outputs a bit Log+Likelihood Ratio (LLR) as results of demodulation to the decoder unit b108.

The decoder unit b108 performs a decoding process on a demodulated symbol input from the demodulator unit b107 using Maximum Likelihood Decoding (MLD), Maximum A posteriori Probability (MAP), log-MAP, Max-log-MAP, SOVA (Soft Output Viterbi Algorithm), or the like.

Figure 7:
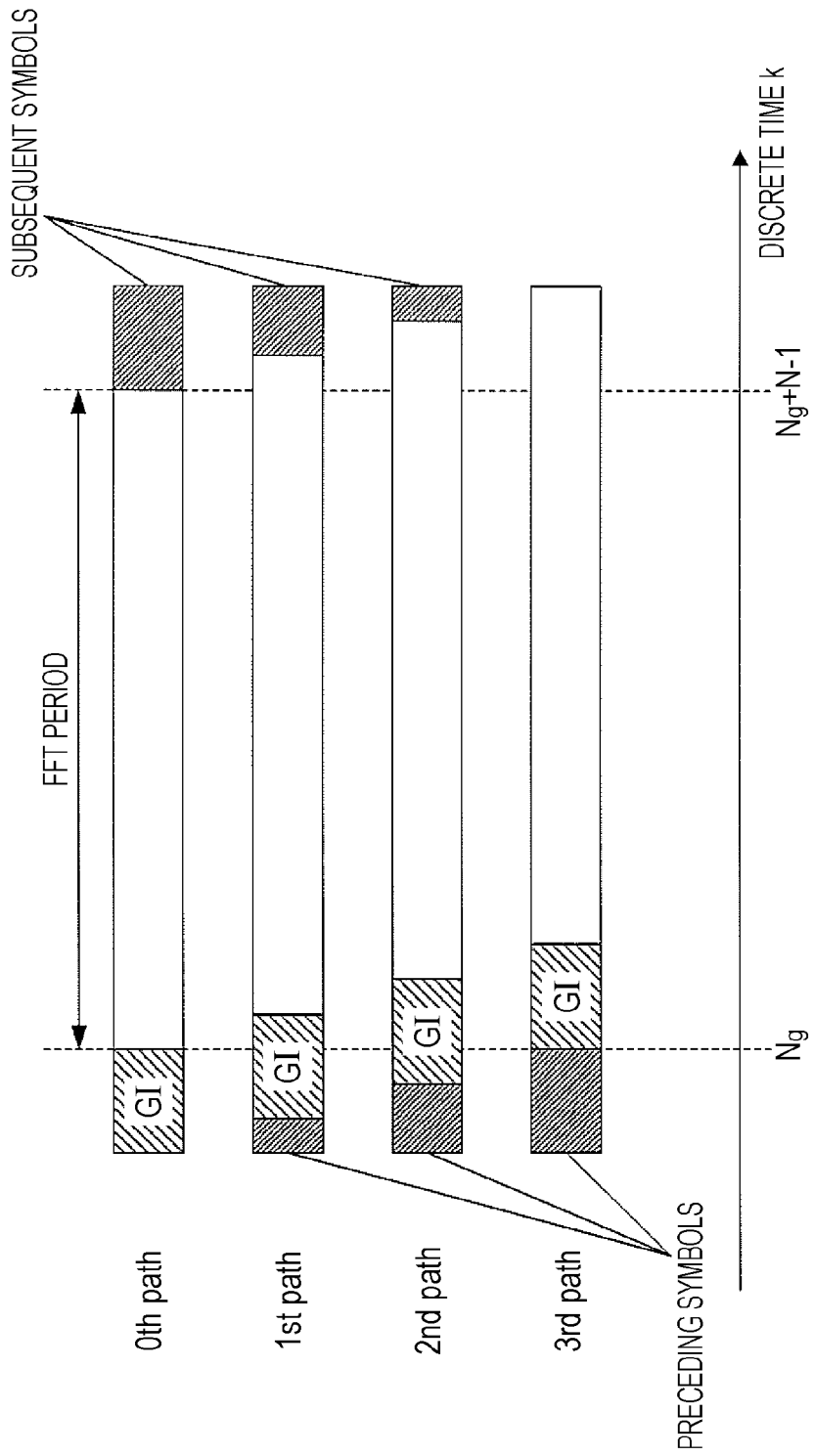
FIG. 7 is a schematic diagram illustrating an example of received signals of the present embodiment.

FIG. 7 is a schematic diagram of an example of a received signal in accordance with the present embodiment. As illustrated in this figure, the maximum delay does not exceed a GI length, and there is no interference from a preceding OFDM symbol.

In this figure, the abscissa is a time axis, and represents discrete time segmented by predetermined time band. As illustrated in this figure, each area hatched with rightward rising diagonal lines represents GI. Each area hatched with leftward rising diagonal lines represents a received signal of preceding and subsequent OFDM symbols.

Here, N represents the number of points in FFT (Fast Fourier Transform) period (also the number of points in an IFFT (Inverse Fast Fourier Transform) period), and $N_g$ represents the number of points of GI. The number of points here refers to the number of discrete times.

Figure 8:
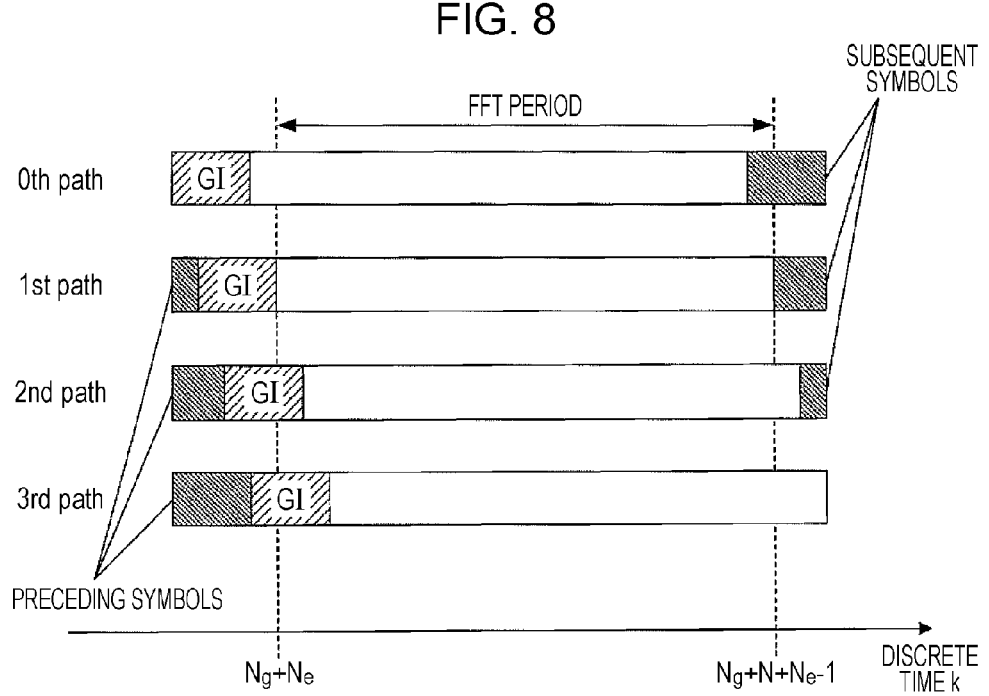
FIG. 8 is a schematic diagram illustrating an example of the received signals of the present embodiment.

FIG. 8 is a schematic diagram illustrating an example of the received signal of the present embodiment. In this figure, a synchronization position is shifted more backward by $N_e$ points than in FIG. 7, and the trailing OFDM symbol of a preceding path becomes interference.

Figure 9:
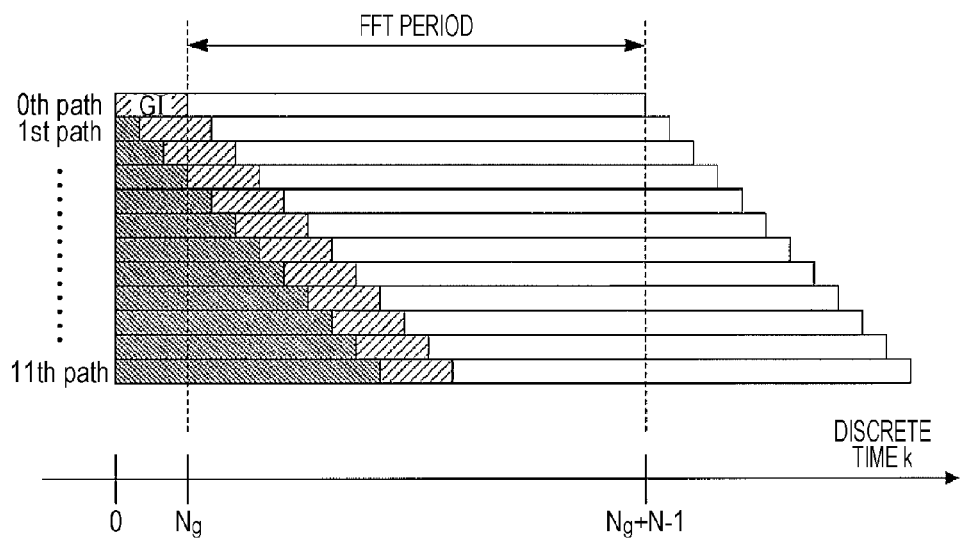
FIG. 9 is a schematic diagram illustrating an example of the received signals of the present embodiment.

FIG. 9 is a schematic diagram illustrating an example of the received signal of the present embodiment. In this figure, the maximum delay exceeds the GI length, and interference from the preceding OFDM symbol occurs.

Figure 10:
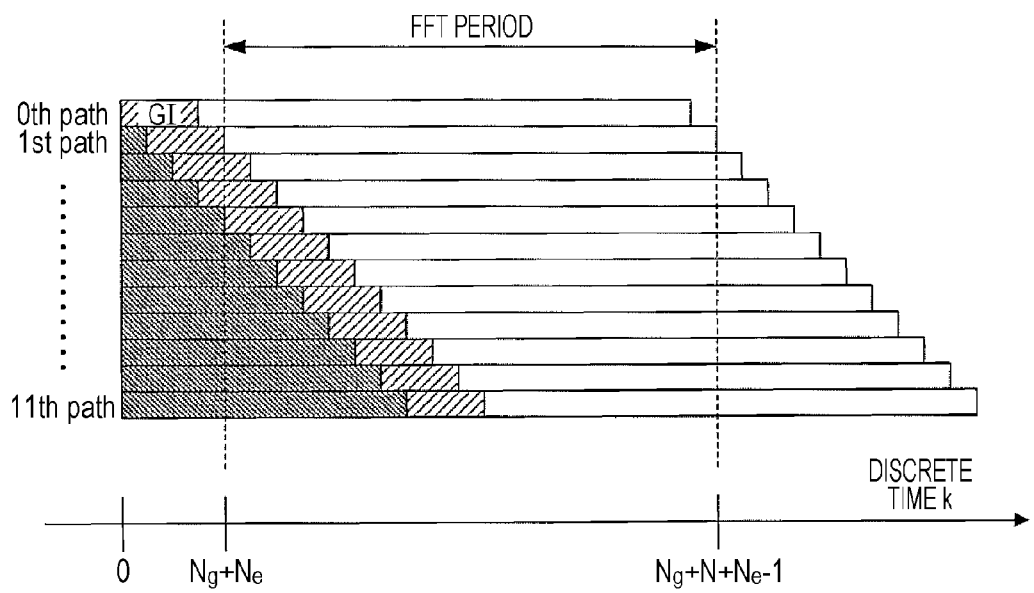
FIG. 10 is a schematic diagram illustrating an example of the received signals of the present embodiment.

FIG. 10 is a schematic diagram illustrating an example of the received signal of the present embodiment. In this figure, the synchronization position is shifted backward by $N_e$ points, and the maximum delay then exceeds the GI length. Interference from the preceding and subsequent OFDM symbols occurs.

If a propagation channel value of each path varies greatly in the EFT period, Inter Carrier Interference (ICI) occurs.

The present invention is effective if the received signal is like the one illustrated in FIG. 10 and if the interference from variations in the propagation channel is present, and the following discussion is based on the assumption that the interference is present.

<Operation Principle>
The operation principle of the receiver apparatus b1 is described with reference to FIG. 5.

Signal $r_{i,k}$ of an i-th symbol at k-th discrete time received by the receiver unit b102 is expressed by Expressions (1) and (2).

[Expressions 1]

$$r_{i,k} = \sum_{d=0}^{D} h_{i,d,k} s_{i,k-d} + z_{i,k} \quad (1)$$

$$s_{i,k} = \frac{1}{\sqrt{N}} \sum_{n=0}^{N-1} S_{i,n} \exp\left[j\frac{2\pi n}{N}(k - N_g)\right] \quad (2)$$

Here, D represents the maximum delay time, $h_{i,d,k}$ represents a complex amplitude at k-th discrete time of a path having a propagation channel number d (referred to as a d-th path) of an i-th symbol, $s_{i,k}$ represents a transmitted signal of the i-th symbol in the time domain, and $Z_{i,k}$ represents noise of the i-th symbol in the time domain. Also, N represents the number of points in the FFT period, $S_{i,n}$ represents a modulated signal of the i-th symbol of an n-th subcarrier, $N_g$ represents the number of points in the GI period (see FIG. 5), and j represents the imaginary unit. It is noted that complex amplitudes of d=0–D are collectively referred to as a channel impulse response.

The FFT unit b103 time-frequency transforms the received signal $r_{i,k}$ in the FFT period, thereby resulting in the signal $R_{i,n}$. The signal $R_{i,n}$ is expressed by the following Expressions (3) and (4).

[Expressions 2]

$$R_{i,n} = \frac{1}{\sqrt{N}} \sum_{k=N_g+N_e}^{N_g+N+N_e-1} r_{i,k} \exp\left[-j\frac{2\pi n}{N}(k - N_g)\right] \quad (3)$$

$$= W_{i,n,n} S_{i,n} + Z'_{i,n}$$

$$Z'_{i,n} = \sum_{m=0, m \neq n}^{N-1} W_{i,n,m} S_{i,m} + \sum_{m=0}^{N-1} V_{i,n,m,0} S_{i-1,m} + \sum_{m=0}^{N-1} V_{i,n,m,1} S_{i+1,m} + Z_{i,n} \quad (4)$$

It is noted herein that there is a synchronization delay of $N_e$ in a backward direction. Here, $W_{i,n,m}$ represents an ICI coefficient of a signal from an m-th subcarrier to an n-th subcarrier, $V_{i,n,m,0}$ represents an ISI coefficient of the immediately preceding OFDM symbol from the m-th subcarrier to the n-th subcarrier, $V_{i,n,m,1}$ represents an ISI coefficient of the immediately subsequent OFDM symbol from the m-th subcarrier to the n-th subcarrier, and $Z_{i,n}$ represents noise of the n-th subcarrier. $Z'_{i,n}$ is a sum of noise, ICI, and ISI. $W_{i,n,n}$ with m=n is a frequency response of the n-th subcarrier, and is represented by the following Expressions (5)-(7).

[Expressions 3]

$$W_{i,n,n} = \sum_{d=0}^{D} a_{d-N_e} c_{i,d} \exp\left[-j\frac{2\pi n}{N}(d - N_e)\right] \quad (5)$$

$$c_{i,d} = \begin{cases} \dfrac{1}{N - N_e + d} \sum_{k=N_g+N_e}^{N_g+N+d-1} h_{i,d,k} & \text{for } 0 \le d < N_e \\ \dfrac{1}{N} \sum_{k=N_g+N_e}^{N_g+N+N_e-1} h_{i,d,k} & \text{for } N_e \le d \le N_g + N_e \\ \dfrac{1}{N + N_g + N_e - d} \sum_{k=N_g+N_e+d}^{N_g+N+N_e-1} h_{i,d,k} & \text{for } N_g + N_e < d \le D \end{cases} \quad (6)$$

$$a_d = \begin{cases} \dfrac{N - |d|}{N} & \text{for } d < 0 \\ 1 & \text{for } 0 \le d \le N_g \\ \dfrac{N_g + N - d}{N} & \text{for } N_g < d \le D \end{cases} \quad (7)$$

It is noted that $C_{i,d}$ represents time average of the channel impulse response that varies in time within the OFDM symbol. The propagation channel estimating unit b106 estimates $W_{i,n,n}$, and this operation is described below. The rest of the function of the receiver apparatus b1 is described based on the assumption that an estimated value has been obtained.

The demodulator unit b107 calculates a demodulation symbol S'i,n in accordance with the following Expression (8) when filtering of the MMSE criterion is used.

[Expression 4]

$$S'_{i,n} = \frac{W^*_{i,n,n}}{W^*_{i,n,n} W_{i,n,n} + \sigma'^2_z} R_{i,n} \qquad (8)$$

Here, Y* represents a complex conjugate of Y. In Expression (8), $\sigma_z'$ is power of $Z'_{i,n}$, and is represented by the following Expression (9).

[Expression 5]

$$\sigma_z'^2 = E[|Z_{i,n}|^2] + \\ E\left[\left|\sum_{m=0,m\neq n}^{N-1} W_{i,n,m}S_{i,m} + \sum_{m=0}^{N-1} V_{i,n,m,0}S_{i-1,m} + \sum_{m=0}^{N-1} V_{i,n,m,1}S_{i+1,m}\right|^2\right] \qquad (9)$$

E[X] here represents an ensemble average of X. The power here is calculated in accordance with Expression (10), and the result of the calculation is used in Expression (8) to calculate the demodulation symbol $S'_{i,n}$.

[Expression 6]

$$\sigma_z''^2 = \left(\sum_{n\in P_i} |R_{i,n}|^2 - |P_i|\right) / |P_i| \qquad (10)$$

Here, $\sigma_z''^2$ is an estimated value of $\sigma_z'^2$, and $P_i$ is a set of pilot subcarriers of the i-th symbol. If it is assumed that an arithmetic average of sufficient numbers equals the ensemble average, a calculation method used herein is based on the fact that Expression (10) is rewritten as Expression (11).

[Expression 7]

$$\sigma_z''^2 = \left(\sum_{n\in P_i} |W_{i,n,n}S_{i,n}|^2 + \sum_{n\in P_i}\left|\sum_{m=0,m\neq n}^{N-1} W_{i,n,m}S_{i,m} + \sum_{m=0}^{N-1} V_{i,n,m,0}S_{i-1,m} + \sum_{m=0}^{N-1} V_{i,n,m,1}S_{i+1,m}\right|^2 + \sum_{n\in P_i} |Z_{i,n}|^2 - |P_i|\right) / |P_i| \qquad (11)$$

$$= \left(|P_i| + \sum_{n\in P_i}\left|\sum_{m=0,m\neq n}^{N-1} W_{i,n,m}S_{i,m} + \sum_{m=0}^{N-1} V_{i,n,m,0}S_{i-1,m} + \sum_{m=0}^{N-1} V_{i,n,m,1}S_{i+1,m}\right|^2 + |P_i|\sigma_z^2 - |P_i|\right) / |P_i|$$

$$= \frac{1}{|P_i|^2}\sum_{n\in P_i}\left|\sum_{m=0,m\neq n}^{N-1} W_{i,n,m}S_{i,m} + \sum_{m=0}^{N-1} V_{i,n,m,0}S_{i-1,m} + \sum_{m=0}^{N-1} V_{i,n,m,1}S_{i+1,m}\right|^2 + \sigma_z^2$$

Here, the first term represents power of ISI and ICI, and the second term represents noise power. In equation (11), the power of the pilot signal is normalized to 1, and the mean power of the frequency response is normalized to 1. More specifically, this Expression is obtained if the following Expression (12) holds.

[Expression 8]

$$\sum_{n\in P_i} |W_{i,n,n}S_{i,n}|^2 = |P_i| \qquad (12)$$

If the power of the pilot signal is not 1, an adjustment coefficient may be introduced accordingly. The normalization of the frequency response is performed in view of an amplitude adjustment when the receiver unit b102 performs analog-to-digital conversion.

The demodulator unit b107 calculates the bit Log Likelihood Ratio from the demodulation symbol $S'_{i,n}$ of Expression (8). In this calculation process, an equivalent amplitude gain is used. More specifically, in the case of QPSK, the equivalent amplitude gain $\mu_{i,n}$ of the n-th subcarrier is expressed by Expression (13) while the bit Log Likelihood Ratios are expressed by the following Expressions (14) and (15). Here, Expressions (14) and (15) are a bit Log Likelihood Ratio $\lambda(b_{,i,n,0})$ of a first bit $b_{i,n,0}$ and a bit Log Likelihood Ratio $\lambda(b_{,i,n,1})$ of a second bit $b_{i,n,1}$.

[Expression 9]

$$\mu_{i,n} = \frac{W^*_{i,n,n} W_{i,n,n}}{W^*_{i,n,n} W_{i,n,n} + \sigma_z'^2} \qquad (13)$$

$$\lambda(b_{i,n,0}) = \frac{4\text{Re}\lfloor S'_{i,n}\rfloor}{\sqrt{2}\,(1-\mu_{i,n})} \qquad (14)$$

$$\lambda(b_{i,n,1}) = \frac{4\text{Im}\lfloor S'_{i,n}\rfloor}{\sqrt{2}\,(1-\mu_{i,n})} \qquad (15)$$

An operation of the propagation channel estimation is described next. The frequency response estimating unit b106-1 calculates an estimated value $W'_{i,n,n}$ of the frequency response in accordance with Expression (3). More specifically, the frequency response estimating unit b106-1 calculates the estimated value in accordance with Expression (16).

[Expression 10]

$$W'_{i,n,n} = \frac{R_{i,n}}{S_{i,n}} \qquad (16)$$

To calculate the estimated value, the signal $S_{i,n}$ of the n-th carrier needs to be known. But the pilot symbol serves this purpose.

A method of estimating the channel impulse response from the estimated value of the frequency is described here. Let $n_1$, $n_2$, ..., $n_p$ be pilot subcarriers, and a frequency response estimation vector $H_p$ is defined as expressed in Expression (17).

[Expression 11]

$$H_p = (W'_{i,n_1,n_1} W'_{1,n_2,n_2} \cdots W'_{i,n_p,n_p})^T \quad (17)$$

Here, bold letter represents a vector or a matrix, and $Y^T$ represents a transpose of Y. For example, if the first OFDM symbol of FIG. 4 is considered, $n_1$ represents the lowest subcarrier, $n_2$ represents the subcarrier higher by two notches, $n_3$ represents the subcarrier higher by further two notches, . . . . The channel impulse response estimation vector hMMSE of MMSE is expressed by Expressions (18-21).

[Expressions 12]

$$h_{MMSE} = C_h F^H (FC_h F^H + \sigma_z'^2 I_{N_P})^{-1} H_P \quad (18)$$

$$F = F'A \quad (19)$$

$$F' = \quad (20)$$

$$\begin{bmatrix} \exp\left(-j\frac{2\pi n_1}{N}(-T)\right) & \exp\left(-j\frac{2\pi n_1}{N}(-T+1)\right) & \cdots & \exp\left(-j\frac{2\pi n_1}{N}L\right) \\ \exp\left(-j\frac{2\pi n_2}{N}(-T)\right) & \exp\left(-j\frac{2\pi n_2}{N}(-T+1)\right) & \cdots & \exp\left(-j\frac{2\pi n_2}{N}L\right) \\ \vdots & \vdots & \ddots & \vdots \\ \exp\left(-j\frac{2\pi n_P}{N}(-T)\right) & \exp\left(-j\frac{2\pi n_P}{N}(-T+1)\right) & \cdots & \exp\left(-j\frac{2\pi n_P}{N}L\right) \end{bmatrix}$$

$$A = \begin{pmatrix} a_{-T} & & & \\ & a_{-T+1} & & \\ & & \ddots & \\ & & & a_L \end{pmatrix} \quad (21)$$

Here, $N_p$ represents the number of pilot subcarriers, and $I_x$ represents a unit matrix having a size x. A negative delay time from the synchronization position is also considered to $-T$. If condition $N_e \leq T$ is satisfied, no problems arise, and the following discussion is based on the assumption that this condition is satisfied. A specific value of T may be determined at the design stage of the receiver apparatus. Alternatively, the specific value of T may be set to be variable at the design stage, and updated when firmware, software and the like of the receiver apparatus are updated.

Figure 11:
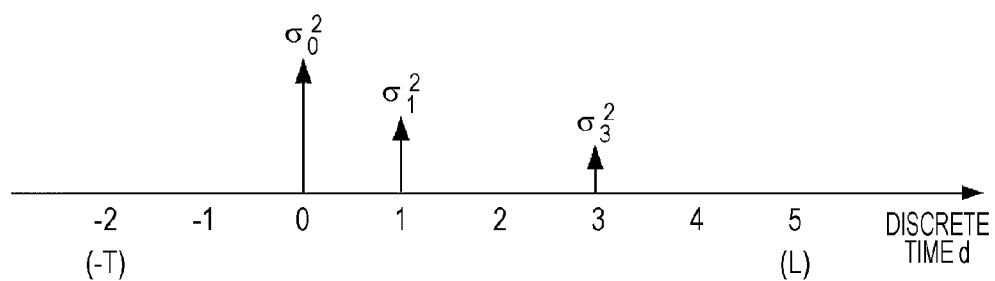
FIG. 11 illustrates paths having average powers $\sigma_0^2$, $\sigma_1^2$, and $\sigma_3^2$ at positions d=0, 1, and 3 in a manner free from synchronization deviation with T=2 and L=5.

$C_h$ represents a diagonal matrix of a size $L+T+1$ having mean power of paths from $-T$ to L as main diagonal elements. FIG. 11 illustrates paths having mean powers $\sigma_0^2$, $\sigma_1^2$, and $\sigma_3^2$ at positions d=0, 1, and 3 with T=2 and L=5 in a manner free from synchronization deviation.

Since the specific $C_h$ is unknown in practice, the calculation is performed with $\sigma_d^2$ being a constant value β regardless of d. Only paths that increase the propagation channel goodness of fit are β, and other paths have 0. In a method described below, out of paths from $-T$ to L, paths that increase the propagation channel goodness of fit are searched for one by one to calculate a final channel impulse response estimation value.

Figure 12:
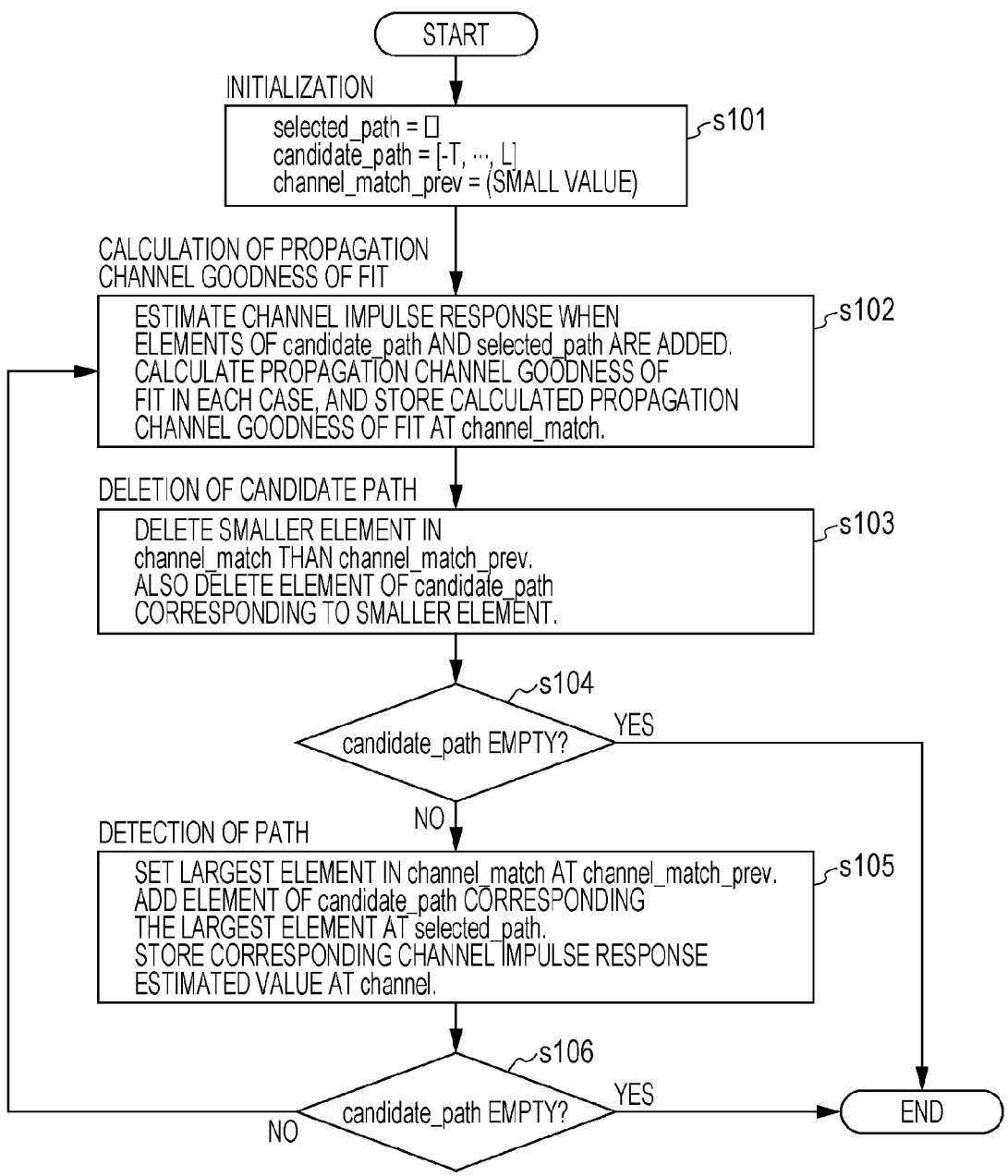
FIG. 12 is an example of a flowchart illustrating an operation of searching for paths one by one.

FIG. 12 is an example of a flowchart illustrating a flow of operation to search for paths one by one. It is noted that this figure indicates the operation of the path detector unit b106-2 (FIG. 6).

(Step 101) As initial values, selected paths (selected_path) is set to be empty, candidate paths (candidate_path) are set to be $-T$ through L as initial values, and the propagation channel goodness of fit (channel_match_prev) is set to be a small value (such as a negative infinite). Processing then proceeds to step S102.

(Step S102) The channel impulse response is estimated when each of the candidate paths (candidate_path) is added to the selected paths (selected_path). More specifically, $C_h$ is set to be β at the path position and 0 at the other positions in Expression (18). In such a case, an amount of calculation may be reduced using Matrix Inversion Lemma. For example, the following Expression (22) may be used in such a case.

[Expression 13]

$$h_q = (F_q^H F_q + \alpha I_{|q|})^{-1} F_q^H H_p \quad (22)$$

Here, q represents a path set when one candidate path is added to the selected paths. For example, if paths at d=0, 1, and 3 are estimated as illustrated in FIG. 11, q=[0, 1, 3]. Here, $h_q$ represents a vector having an estimated value of the path position, and does not contain information at a position where zero is set. $F_q$ is a matrix resulting from extracting a column corresponding to an element of q from F of Expression (19), $|q|$ is the number of paths then, and $\alpha = \sigma_z'^2/\beta$. If paths at d=0, 1, and 3 are estimated as illustrated in FIG. 11, Fq is expressed by Expression (23).

[Expression 14]

$$F_q = \begin{bmatrix} \exp\left(-j\frac{2\pi n_1}{N}0\right) & \exp\left(-j\frac{2\pi n_1}{N}1\right) & \exp\left(-j\frac{2\pi n_1}{N}3\right) \\ \exp\left(-j\frac{2\pi n_2}{N}0\right) & \exp\left(-j\frac{2\pi n_2}{N}1\right) & \exp\left(-j\frac{2\pi n_2}{N}3\right) \\ \vdots & \vdots & \vdots \\ \exp\left(-j\frac{2\pi n_P}{N}0\right) & \exp\left(-j\frac{2\pi n_P}{N}1\right) & \exp\left(-j\frac{2\pi n_P}{N}3\right) \end{bmatrix} \quad (23)$$

α may be set to be constant regardless of q, and may have a representative value corresponding to $\sigma_z'^2$. The representative value may be set to be variable at the design stage, and may then be updated when firmware, software, or the like of the receiver apparatus b1 is updated.

Next, the propagation channel goodness of fit is calculated each time a path candidate is added. The propagation channel goodness of fit is expressed by model evidence M(q) of the following Expression (24).

[Expression 15]

$$M(q) = \int p(H_P | h_{q,t}) p(h_{q,t}) dh_{q,t} \quad (24)$$

$$= \frac{(F_q^H H_P)^H h_q}{\sigma_z'^2} \sigma_p^2 - \ln\det\left(\frac{1}{\alpha} F_q^H F_q + I_{|q|}\right)$$

Here, $p(H_p|h_{q,t})$ is a likelihood function, $p(h_{q,t})$ is a prior probability, and $h_{q,t}$ is a variable vector that represents a channel impulse response in the same path structure as q. $\sigma_p^2$ is power of the pilot symbol. The first term represents a quantity caused by an error between an estimated value and an observed value, and the second term represents a penalty involved in the complexity of a model. The penalty of Expression (24) is suitable for radio communications when estimated values of several frequency responses ($n_1, n_2, \ldots, n_p$ in this case) are determined. The penalty of Expression (24) is determined by the assignment frequency of the pilot symbol.

The first term of Expression (24) is an evaluation value of the error between the estimated value and the observed data (received signal), and more specifically represents a goodness of fit between an estimation vector $h_q$ and a frequency response estimation vector of Expression (17). The second term of Expression (24) (including a minus sign) becomes smaller as the paths for use in estimation become more, and serves as a penalty restricting an increase of the whole Expression (24).

Another quantity represented by the sum of the evaluation value of the error and the penalty may be used for the propagation channel goodness of fit. For example, information quantity criteria, such as the Akaike Information Criteria (AIC) or the Bayesian Information Criterion (BIC), may be used. Processing then proceeds to step S103.

(Step S103) The channel impulse response is estimated using the paths inclusive of elements of the candidate path (candidate_path) and the selected paths (selected_path). Paths having the propagation channel goodness's of fit smaller than the propagation channel goodness of fit of the estimated value of the selected paths (selected_path) alone are deleted from the candidate paths. More specifically, the corresponding path numbers are deleted from the candidate_path. The corresponding propagation channel goodness's of fit are deleted from the propagation channel goodness of fit (channel_match). Processing then proceeds to step S104.

(Step S104) If any other path is no longer present as a result of step S103, that is, candidate_path is empty, the process ends. If a candidate path remains, processing proceeds to step S105.

(Step S105) The element of the candidate paths (candidate_path) having the largest goodness of fit of the propagation channel goodness of fit (channel_match) obtained is added as a selected path (selected_path) as a newly selected path. The channel impulse response is then stored on channel. The propagation channel goodness of fit then is stored in channel_match_prev. Processing then proceeds to step S106.

(Step S106) If any other path is no longer present as a result of step S105, that is, candidate_path is empty, the process ends. If a candidate path remains, processing returns to step S102.

The channel impulse response stored in channel is finally output to the FFT unit b106-3. The FFT unit b106-3 time-frequency transforms the channel impulse response estimation value input from the path detector unit b106-2, thereby transforming the channel impulse response estimation value over to the frequency response of all subcarriers.

<Operation of Receiver Apparatus b1>

Figure 13:
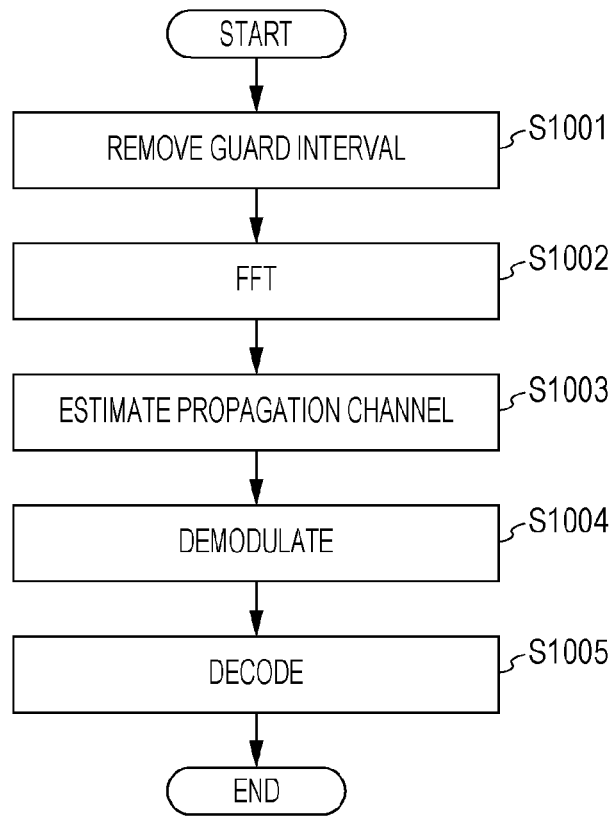
FIG. 13 is a flowchart illustrating an operation of a receiver apparatus of the present embodiment.

FIG. 13 is a flowchart illustrating the operation of the receiver apparatus of the present embodiment. The operation illustrated in this figure is a process performed after the receiver unit b102 of FIG. 5 outputs the received signal to the GI removal unit b103.

(Step S1001) The GI removal unit b103 removes a guard interval from the received signal. Processing proceeds to step S1002.

(Step S1002) The FFT unit b104 time-frequency transforms the signal obtained in step S1001. The demapping unit b105 separates data and a pilot from the resulting signal in the frequency domain. The demapping unit b105 outputs the received signal of the pilot subcarrier to the propagation channel estimating unit b106, and processing proceeds to step S1003.

(Step S1003) The propagation channel estimating unit b106 estimates the propagation channel using the received signal of the pilot subcarrier obtained in step S1002, and then outputs to the demodulator unit b107 the frequency response estimation value to be demodulated. Processing then proceeds to step S1004.

(Step S1004) The demodulator unit b107 performs a demodulation process using the frequency response estimation value obtained in step S1003. Processing then proceeds to step S1005.

(Step S1005) The decoder unit b108 decodes the demodulation results obtained in step S1004. The receiver apparatus b1 then ends the process thereof.

In accordance with the present embodiment, the propagation channel estimating unit b106 detects paths one by one that increase the propagation channel goodness of fit, leading to increasing estimation accuracy. In this way, the paths to be estimated are limited to those necessary, and suppressing effect on noise and interferences is increased. The propagation channel estimation accuracy is thus increased. Since an operation of deleting paths that do not increase the propagation channel goodness of fit is performed concurrently, an amount of calculation is substantially reduced.

In the discussion of the first embodiment, the frequency response is estimated using the pilot symbol on each OFDM symbol. Interpolation may be performed using the pilot symbol of an adjacent OFDM symbol. For example, as illustrated in FIG. 4, in the first OFDM symbols, in terms of position, the pilot subcarriers includes the lowest subcarrier, another subcarrier away by two notches, yet another subcarrier away by further two notches, . . . . Even at a position where no pilot subcarrier is present, the estimation process may be performed using a pilot symbol of an OFDM symbol at different time.

The estimation process is performed for the subcarrier having the pilot symbol using a pilot symbol at different time, and noise and interferences are thus reduced. The propagation channel estimation accuracy is even more increased in this way. More specifically, if variations in the propagation path are not large, the arithmetic averages may be used, or weighted averaging may be performed in response to the propagation path variations. A portion of noise and interferences that has been reduced in the stage of the frequency response estimation may be accounted for in $\sigma'^2_z$ in Expression (24). For example, if frequency responses at two times are averaged with no variations in time, $\sigma'^2_z$ is halved.

As described above, the pilot symbol is used as a reference signal for use in the estimation of the frequency response in the first embodiment. The frequency response may be estimated using data that has been determined. More specifically, the output of the demodulator unit b107 or the decoder unit b108 may be fed back to the frequency response estimating unit b106-1 to estimate the frequency response.

As described above, paths are detected one by one in the first embodiment. The number of paths that are detected at a time may be increased. The number of paths may be predetermined. The number of paths may be set to be variable at the design stage, and may then be updated when firmware, software, or the like of the receiver apparatus b1 is updated.

As described above, the method of detecting the paths continues until the delay time L is implemented. The number of candidate paths is limited by another technique in advance before the method of detecting the paths is performed. More specifically, the technique described with reference to NPL 1 in the Background Art section may be used.

As described above, the communication system performs communications using a multi-carrier signal in the first embodiment. The present invention is not limited to this communication. The present invention is applicable to communications of a single-carrier signal performed using FFT.

As described above, the method of detecting paths one by one and concurrently deleting a path that fails to increase the propagation channel goodness of fit is employed in the first embodiment. The deleting may be omitted.

The first embodiment is based on the assumption that the paths have equal power with α being constant as expressed in Expressions (22) and (24). Alternatively, the paths may be weighted. More specifically, a plurality of values α corresponding to added paths are prepared when the estimation of the channel impulse response and the calculation of the propagation channel goodness of fit are performed by adding the elements of the candidate paths (candidate_path) in s102 in the flowchart of the propagation channel estimation of FIG. 12. A maximum propagation channel goodness of fit as a result of calculation of the plurality of values α may be stored in channel_match.

Figure 14:
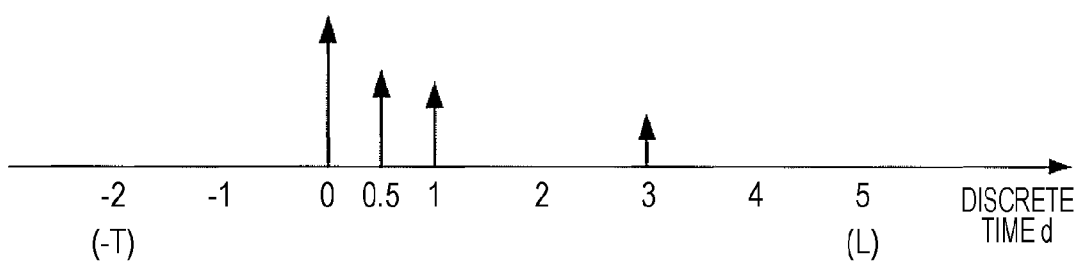
FIG. 14 illustrates an example of a path structure.

As described above, the path position is present at a sampling position of FFT as expressed in Expression (1) in the first embodiment. It is also contemplated that the path is located between sampling points. In such a case, Fourier transform matrix of Expression (19) includes a decimal point position. For example, if a path structure of FIG. 14 is considered, the Fourier transform matrix becomes the following Expression (25).

[Expression 16]

$$F_q = \begin{bmatrix} \exp\left(-j\frac{2\pi n_1}{N}0\right) & \exp\left(-j\frac{2\pi n_1}{N}0.5\right) & \exp\left(-j\frac{2\pi n_1}{N}1\right) & \exp\left(-j\frac{2\pi n_1}{N}3\right) \\ \exp\left(-j\frac{2\pi n_2}{N}0\right) & \exp\left(-j\frac{2\pi n_2}{N}0.5\right) & \exp\left(-j\frac{2\pi n_2}{N}1\right) & \exp\left(-j\frac{2\pi n_2}{N}3\right) \\ \vdots & \vdots & \vdots & \vdots \\ \exp\left(-j\frac{2\pi n_P}{N}0\right) & \exp\left(-j\frac{2\pi n_P}{N}0.5\right) & \exp\left(-j\frac{2\pi n_P}{N}1\right) & \exp\left(-j\frac{2\pi n_P}{N}3\right) \end{bmatrix} \quad (25)$$

Second Embodiment

A second embodiment of the present invention is described in detail with reference to the drawings. In the first embodiment, the transmitter apparatus a1 transmits a multi-carrier signal and the like, which maps the pilot signal to the frequency domain, the receiver apparatus b1 calculates the frequency response estimation value in the pilot subcarrier, and then selects paths one by one that increase the propagation channel goodness of fit when the channel impulse response is estimated. As described below, the present embodiment implements a method of estimating the channel impulse response when the pilot symbols are consecutively transmitted in the time domain.

Figure 15:
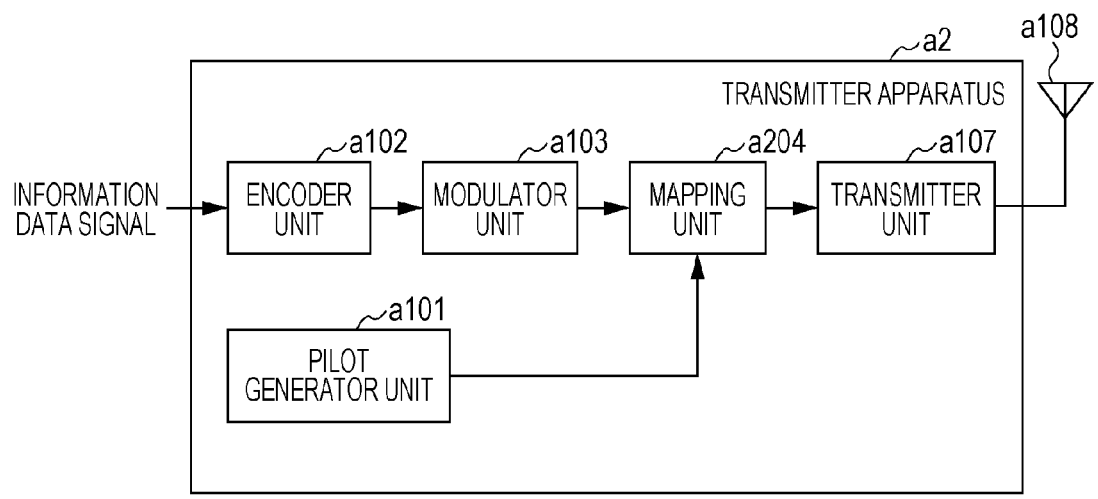
FIG. 15 is a general block diagram illustrating a structure of a transmitter apparatus of a second embodiment of the present invention.

FIG. 15 is a general block diagram of a transmitter apparatus a2 of the second embodiment of the present invention. In comparison of the transmitter apparatus a2 of the present embodiment (FIG. 15) with the transmitter apparatus a1 of the first embodiment (FIG. 3), the mapping unit a204 performs a different process, and both the IFFT unit and the GI insertion unit are not present in the transmitter apparatus a2. However, the functions of the other elements (the pilot generator unit a101, the encoder unit a102, the modulator unit a103, the transmitter unit a107, and the transmitting antenna unit a108) are identical to those of the first embodiment. The discussion of the functions identical to those of the first embodiment is omitted.

Figure 16:
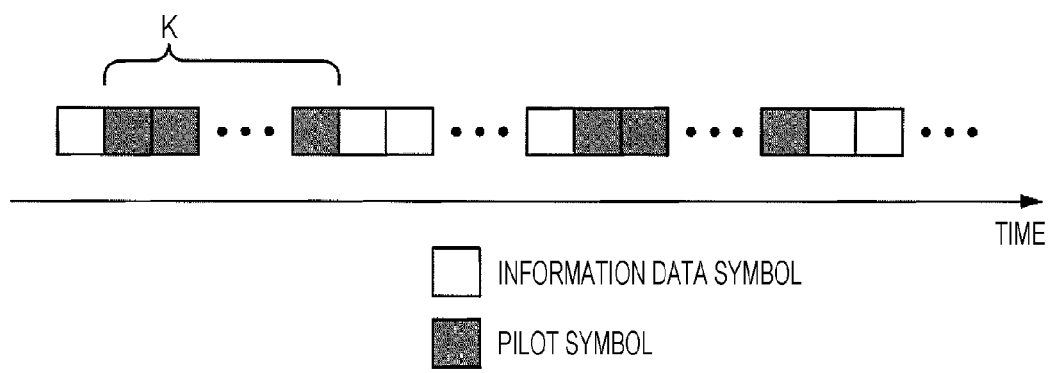
FIG. 16 illustrates a mapping example in which a mapping unit maps information data symbols to pilot symbols.

The mapping unit a204 maps a pilot symbol input from the pilot generator unit a101 and a modulation symbol input from the modulator unit a103 to the time domain in accordance with predetermined mapping information, thereby generating a signal in the time domain. The mapping unit a204 then outputs the generated signal in the time domain to the transmitter unit a107. The transmitter apparatus a2 has determined the mapping information and notified the receiver apparatus b2 of the mapping information in advance. FIG. 16 illustrates a mapping example in which the mapping unit a204 maps an information data symbol to a pilot symbol. As illustrated in this figure, each blank square denotes an information data symbol, and each shadowed square represents a pilot symbol. The pilot symbols are consecutively transmitted by K symbols.

Figure 17:
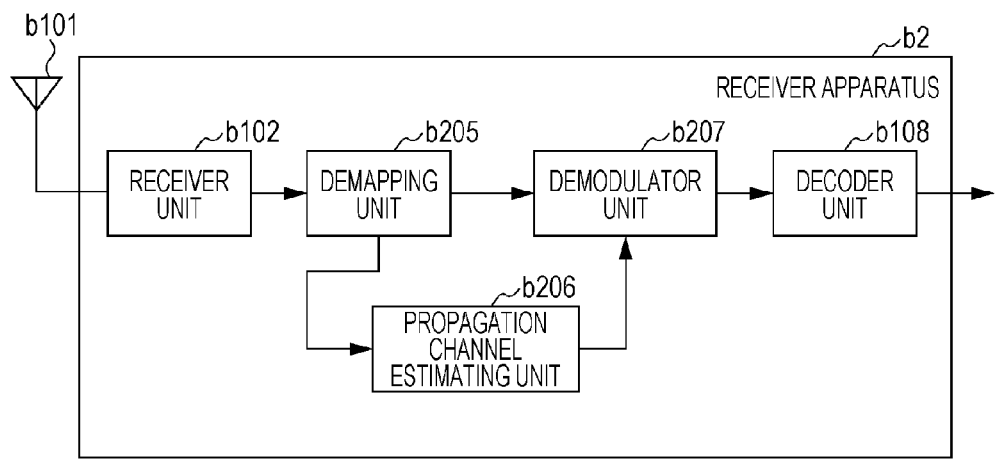
FIG. 17 is a general block diagram illustrating the structure of a receiver apparatus b2 of the second embodiment of the present invention.

FIG. 17 is a general block diagram of the receiver apparatus b2 of the second embodiment of the present invention. In comparison of the receiver apparatus b2 of the present embodiment (FIG. 17) with the receiver apparatus b1 of the first embodiment (FIG. 5), a demapping unit b205, a propagation channel estimating unit b206, and a demodulator unit b207 are different in function from the counterparts thereof in the receiver apparatus b1, and neither the GI removal unit nor the FFT unit is used. However, the functions of the other elements (the receiving antenna unit b101, the receiver unit b102, and the decoder unit b108) are identical to the functions of the counterparts thereof in the first embodiment. The discussion of the same functions as those in the first embodiment is omitted herein.

The demapping unit b205 performs a demapping operation in accordance with the mapping information transmitted beforehand by the transmitter apparatus a2, and outputs to the propagation channel estimating unit b206 received signal at the time the separated pilot symbol is transmitted. The demapping unit b205 outputs to the demodulator unit b207 the received signal at the time the data is transmitted.

Figure 18:
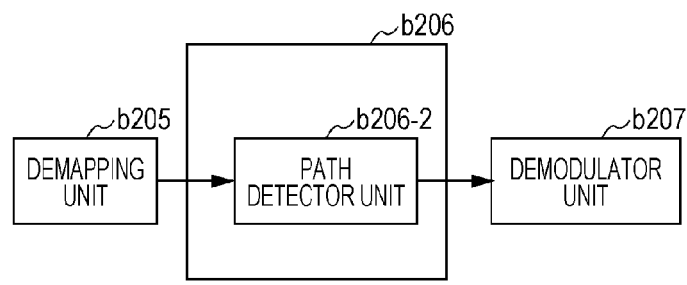
FIG. 18 is a general block diagram illustrating the structure of a propagation channel estimating unit b206.

FIG. 18 is a general block diagram illustrating the structure of the propagation channel estimating unit b206. In this figure, the propagation channel estimating unit b206 includes a path detector unit b206-2.

The path detector unit b206-2 detects within a range to a assumed maximum delay time L paths one by one that increase the propagation channel goodness of fit, in accordance with the received signal input from the demapping unit b205 and the pre-stored pilot symbol. The path detector unit b206-2 concurrently estimates the channel impulse response. The path detector unit b206-2 selects paths starting with a path giving a large increase in the propagation channel goodness of fit. The path detector unit b206-2 concurrently deletes paths that fail to increase the propagation channel goodness of fit. The principle of this operation is described below.

The path detector unit b206-2 completes the process thereof when any path that increases the propagation channel goodness of fit is no longer present, and outputs an estimated value of the channel impulse response to the demodulator unit b207. As described herein, the pilot symbol is used as a reference signal in the present embodiment. A waveform of the pilot symbol in time is used as a physical structure for use in the calculation of the propagation channel goodness of fit.

The propagation channel estimating unit b206 operates on the assumption that the assumed maximum delay time L has been predetermined. This remains unchanged from the first embodiment. The propagation channel estimating unit b206 measures noise power using a pre-stored pilot symbol.

The demodulator unit b207 performs a demodulation process using the received signal input from the demapping unit b205 and the channel impulse response estimation value input from the propagation channel estimating unit b206. In this case, ISI caused by multi-paths is compensated for. To this end, related art techniques, such as MMSE or MLSE (Maximum Likelihood Sequence Estimation), may be employed.

<Operation Principle>

The operation principle of the receiver apparatus b2 is described with reference to FIG. 17.

The received signal $r_i$ of the i-th symbol received by the receiver unit b102 is expressed by Equation (26).

[Expression 17]

$$r_i = \sum_{d=0}^{D} h_{i,d} s_{i-d} + z_i \quad (26)$$

Here, $h_{i,d}$ represents a complex amplitude of a d-th path of the i-th symbol, $S_i$ represents an i-th transmission symbol, and $z_i$ represents the noise of an i-th symbol.

The operation of the propagation channel estimating unit is described next. The path detector unit b206-2 searches for paths one by one that increase the propagation channel goodness of fit from among the paths of −T through L, and calculates a final channel impulse response estimation value. This process is identical to that of the flowchart of FIG. 12. However, a specific operation of calculating the channel impulse response estimation value and a specific operation of calculating the propagation channel goodness of fit are different from those in the flowchart of FIG. 12. In the discussion of the present embodiment, the operations different from those in the first embodiment are described with reference to the flowchart of FIG. 12.

Figure 19:
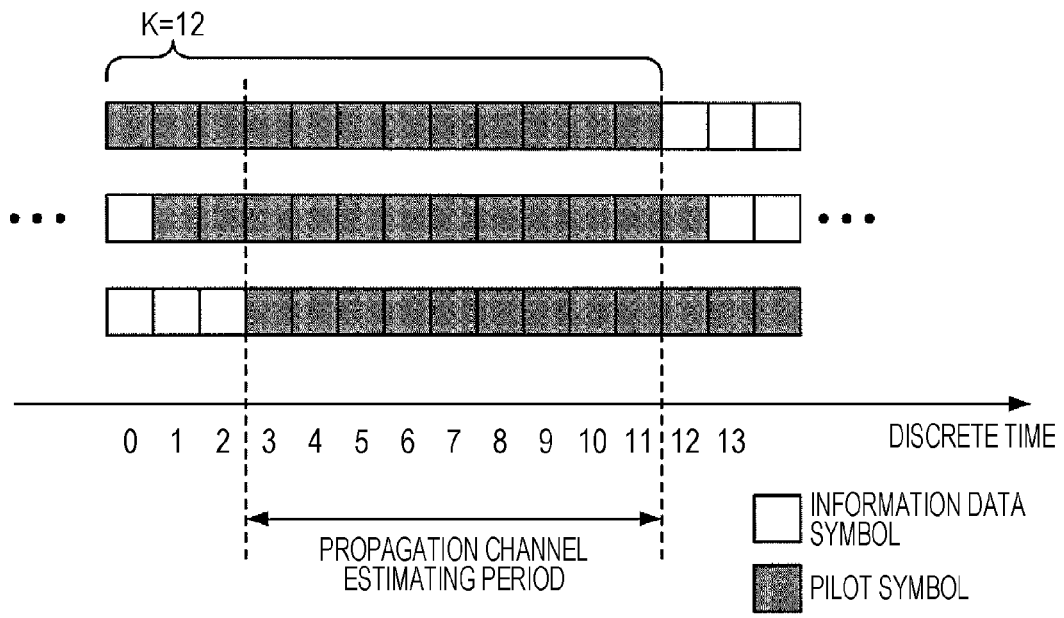
FIG. 19 illustrates a received signal model that is estimated with delay times of d=0, 1, and 3 and with K=12 as illustrated in FIG. 11.

The estimation of the channel impulse response estimation value in step S102 in the second embodiment is described below. Let $s_0, \ldots, s_{K-1}$ be pilot symbols. FIG. 19 illustrates a received signal model if delay times d=0, 1, and 3 are assumed as illustrated in FIG. 11. In this figure, K=12. As illustrated in FIG. 19, a propagation channel estimation period is limited to a period where no ISI occurs. More specifically, let $D_q$ be a maximum delay time from among the paths included in q, and $D_q$ through K−1 becomes an estimation period. In this case, discrete times 3 through 11 become an estimation time.

A received signal vector $r_q$ with q representing a set of estimated paths is expressed by the following Expression (27).

[Expression 18]

$$r_q = (r_{D_q} \ldots r_{K-1}) \quad (27)$$

If no variations occur in the propagation channel during the propagation channel estimation period ($h_{i,d}=h_d$), an estimated vector $h_q$ of the channel impulse response is expressed by the following Expression (28).

[Expression 19]

$$h_q = (S_q^H S_q + \alpha I_{|q|})^{-1} S_q^H r_q \quad (28)$$

Here, $S_q$ represents a matrix composed of pilot symbols, and may be expressed as the following Expression (29) if the estimation is performed on the assumption of the delay times d=0, 1, and 3 as illustrated in FIG. 11.

[Expression 20]

$$S_{q=5} = \begin{pmatrix} s_3 & s_2 & s_0 \\ s_4 & s_3 & s_1 \\ \vdots & \vdots & \vdots \\ s_{K-1} & s_{K-2} & s_{K-4} \end{pmatrix} \quad (29)$$

The propagation channel goodness of fit is calculated as expressed by the following Equation (30).

[Expression 21]

$$M(q) = \int p(r_q \mid h_{q,t}) p(h_{q,t}) dh_{q,t} \quad (30)$$

$$= \frac{(S_q^H r_q)^H h_q}{\sigma_z^2} \sigma_p^2 - \ln\det\left(\frac{1}{\alpha_q} S_q^H F_q + I_{|q|}\right)$$

Here, $\sigma_z^2$ represents power of $z_i$. Penalty of Expression (30) is determined by a time waveform of the pilot symbol.

<Operation of the Receiver Apparatus b2>

Figure 20:
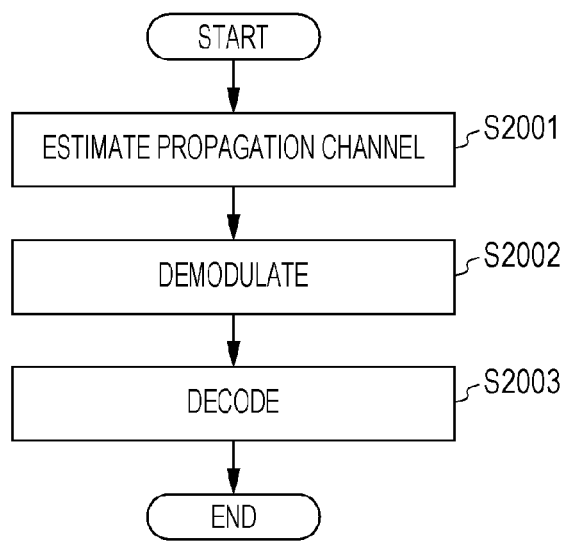
FIG. 20 is a flowchart illustrating the operation of the receiver apparatus of the second embodiment of the present invention.

FIG. 20 is a flowchart illustrating an operation of the receiver apparatus of the present embodiment. The process of this figure is to be performed after the receiver unit b102 outputs the received signal to the demapping unit b205 in FIG. 17.

(Step S2001) The demapping unit b205 separates data and pilots from the input received signal. The propagation channel estimating unit b206 estimates the propagation channel using the received signal of the obtained pilot symbol, and then outputs the channel impulse response estimation value to the demodulator unit b207. Processing then proceeds to step S2002.

(Step S2002) The demodulator unit b207 performs a demodulation operation using the channel impulse response estimation value obtained in step S2002. Processing then proceeds to step S2003.

(Step S2003) The decoder unit b108 decodes demodulation results obtained in step S2002. The receiver apparatus b2 then ends the process thereof.

In accordance with the present embodiment in this way, the propagation channel estimating unit b206 detects paths one by one that increase the propagation channel goodness of fit, thereby increasing estimation accuracy. In this way, the paths to be estimated are limited to only those necessary, and suppressing effect on noise and interferences is increased. The propagation channel estimation accuracy is thus increased. Since an operation of deleting a path that does not increase the propagation channel goodness of fit is performed concurrently, an amount of calculation is substantially reduced.

In the above discussion, only a chunk of K pilot symbols is used to estimate the channel impulse response in the second embodiment. A plurality of chunks may be used. For example, two chunks including the first K symbols of FIG. 12 and the next chunk of K symbols in succession to subsequent continuous data may be used. More specifically, the channel impulse response may be estimated on a per chunk basis, and then the resulting channel impulse responses may be averaged. In the averaging, weighted average may be used in view of time variations. Expression (28) may be extended to perform one-time calculation. In such a case, dimensions of the received signal vector $r_i$ of Expression (28) may be extended from (K−$D_q$) to an integer multiple of (K−$D_q$).

The period of $D_q$ through (K−1) is set to be the channel impulse response estimation period as illustrated in FIG. 18 in the second embodiment, but may be extended. For example, the channel impulse response estimation period may be extended to 0 through (K+$D_q$−1). In such a case, the estimation may be performed over the entire period where pilot symbols are observed. The effect of ISI leaked during the estimation period needs to be considered and added to noise power.

Figure 21:
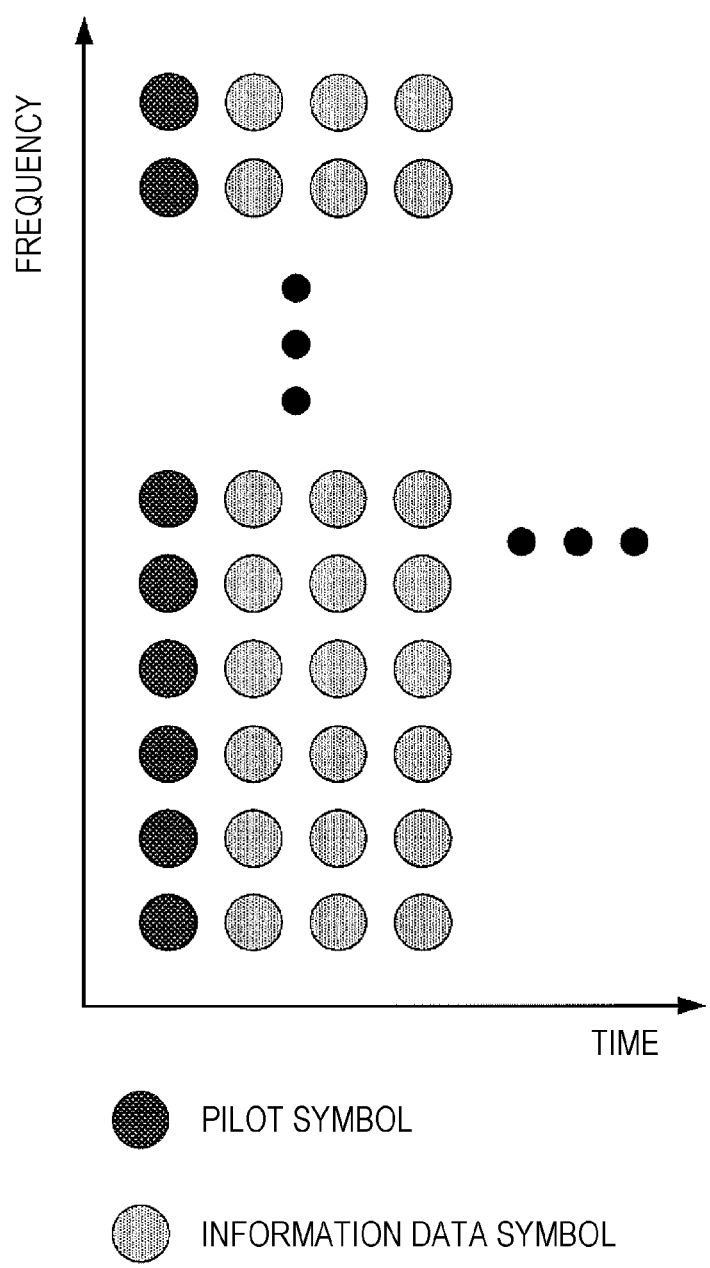
FIG. 21 illustrates a mapping example of OFDM symbols in which pilot symbols is mapped to all sub-carriers.

In the above discussion, the pilot symbol is mapped to the time domain in the second embodiment. The second embodiment may be applicable if the pilot symbol is mapped to the frequency domain as in the first embodiment. For example, if the OFDM symbol with the pilot symbols mapped to all the subcarriers as illustrated in FIG. 21 is available, the IFFT results become a known symbol series in the time domain. Alternatively, once the decoding process is performed, the data symbol may also be handled as a reference signal. The IFFT results may be handled as the reference signal in the time domain. In such a case, the present embodiment is applicable.

In the above discussion, paths are detected one by one in the second embodiment. Optionally as in the first embodiment, the number of paths detected at a time may be increased in the second embodiment.

In the method of the second embodiment discussed above, paths are detected one by one and a path that does not increase the propagation channel goodness of fit is deleted. The deleting may be omitted.

The second embodiment is based on the assumption that the paths are equal in power with a being constant in accordance with Expressions (28) and (30). Alternatively, the paths may have weighed powers as in the first embodiment.

In the above discussion, the path is present at the sampling position of the transmission symbol. It is also contemplated that the path is located between sampling points. In such a case, from among signals resulting from filtering a series of transmission symbols through the transmitter unit a107 of FIG. 15, those in a desired sampling period may be extracted and used for $S_q$ in Expressions (28) and (30). The received signal also needs to be analog-to-digital converted at a desired sampling frequency.

Third Embodiment

A third embodiment of the present invention is described in detail below with reference to the drawings. The propagation channel estimating unit in the first and second embodiments detects paths and estimates a channel impulse response concurrently. Unlike the first and second embodiments, as described below, the present embodiment includes a propagation channel estimating unit that receives information about detected paths from the outside and uses the received information.

A transmitter apparatus a3 of the present embodiment is identical in structure to the transmitter apparatus a1 of the first embodiment (FIG. 3) or to the transmitter apparatus a2 of the second embodiment (FIG. 15), and the discussion thereof is omitted herein. The following discussion focuses on the use of the transmitter apparatus a1, but also applies to the use of the transmitter apparatus a2.

Figure 22:
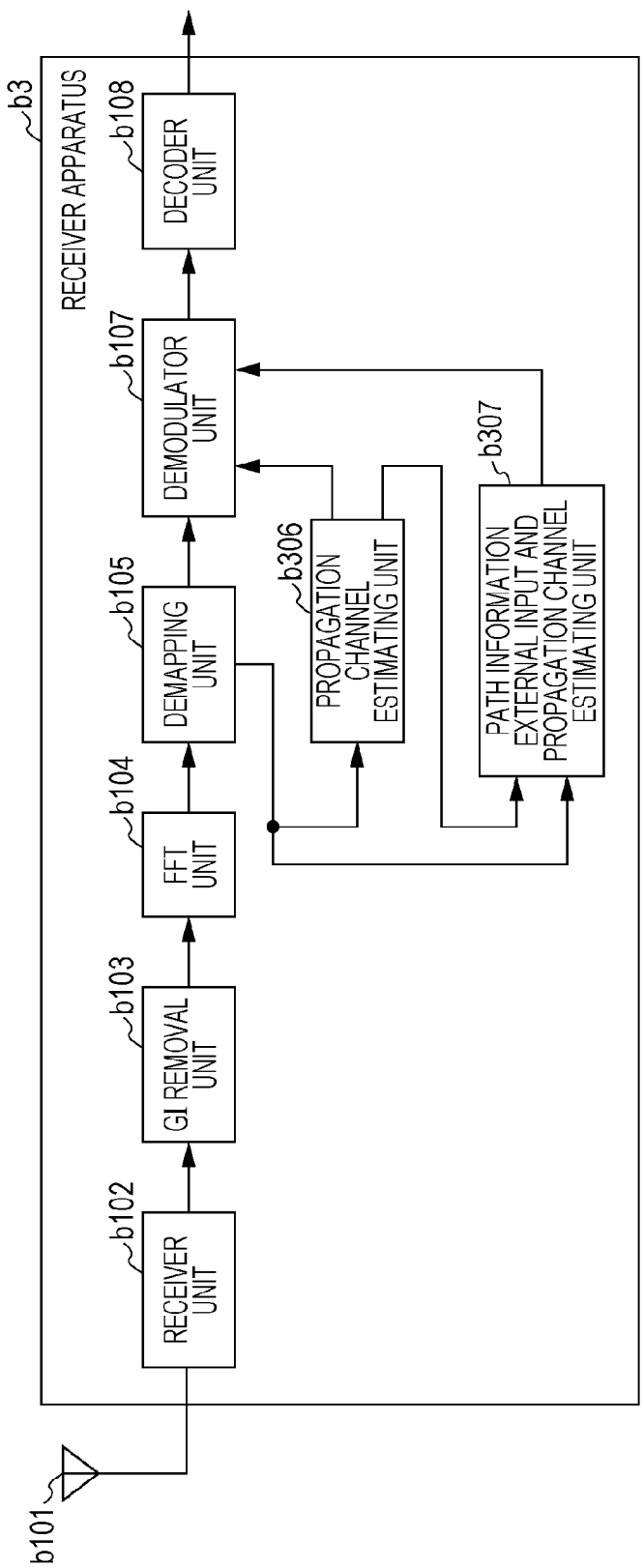
FIG. 22 is a general block diagram illustrating the structure of a receiver apparatus b3 of a third embodiment of the present invention.

FIG. 22 is a general block diagram illustrating the structure of a receiver apparatus b3 of the third embodiment of the present invention. In comparison of the receiver apparatus b3 of the present embodiment (FIG. 22) with the receiver apparatus b1 of the first embodiment (FIG. 5), the propagation channel estimating unit b306 performs a different process and a path information external input and propagation channel estimating unit b307 is added in the receiver apparatus b3. However, the functions of the other elements (the receiving antenna unit b101, the receiver unit b102, the GI removal unit b103, the FFT unit b104, the demapping unit b105, the demodulator unit b107, and the decoder unit b108) remain unchanged from those of the counterparts in the first embodiment. The discussion of the same functions as those of the first embodiment is omitted herein.

Figure 23:
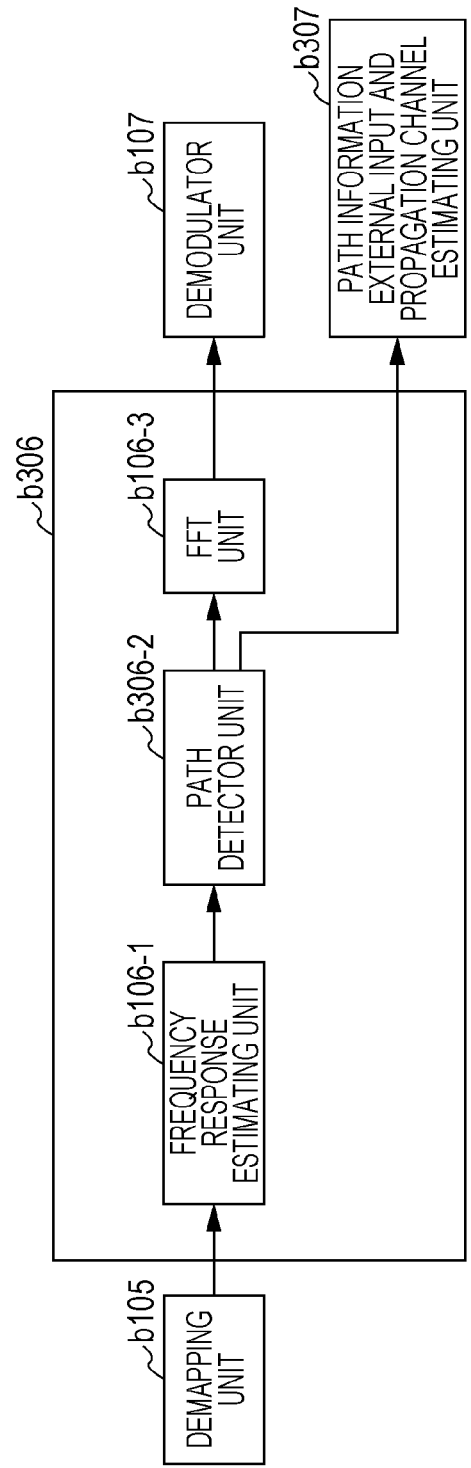
FIG. 23 is a general block diagram illustrating the structure of a propagation channel estimating unit b306.

FIG. 23 is a general block diagram of the propagation channel estimating unit b306. If the propagation channel estimating unit b306 (FIG. 23) in the receiver apparatus b3 is compared with the propagation channel estimating unit b106 (FIG. 6) in the receiver apparatus b1, the process of the path detector unit b306-2 becomes different. More specifically, the path detector unit b306-2 not only outputs a final channel impulse response estimation value to the FFT unit b106-3 but also outputs path position information of paths to the path information external input and propagation channel estimating unit b307. In this case, the path position information of the paths that is finally output is the finally selected paths (selected_path) in the flowchart of FIG. 12.

The path information external input and propagation channel estimating unit b307 performs the propagation channel estimation using the path position information output by the propagation channel estimating unit b306 and the received signal of the pilot subcarrier output by the demapping unit b105. More specifically, the path information external input and propagation channel estimating unit b307 determines q in Expression (22) in response to the input from the outside. The estimation value to be calculated may be determined in accordance with Expression (22).

In accordance with the present embodiment in this way, the propagation channel estimating unit b306 detects paths during a long period of time, and the path information external input and propagation channel estimating unit b307 may be used until selection path information has been updated. Because of the path detection process, an amount of calculation operation of the propagation channel estimating unit b306 is larger than that of the path information external input and propagation channel estimating unit b307. This arrangement allows the propagation channel estimating unit b306 to have a margin in the process thereof.

The path information external input and propagation channel estimating unit b307 uses the pilot symbol as a reference signal in the third embodiment. The third embodiment is not limited to this method. For example, determined data may be used. In such a case, corresponding data from the decoder unit b108 is fed back to the path information external input and propagation channel estimating unit b307 as illustrated in FIG. 22.

Figure 24:
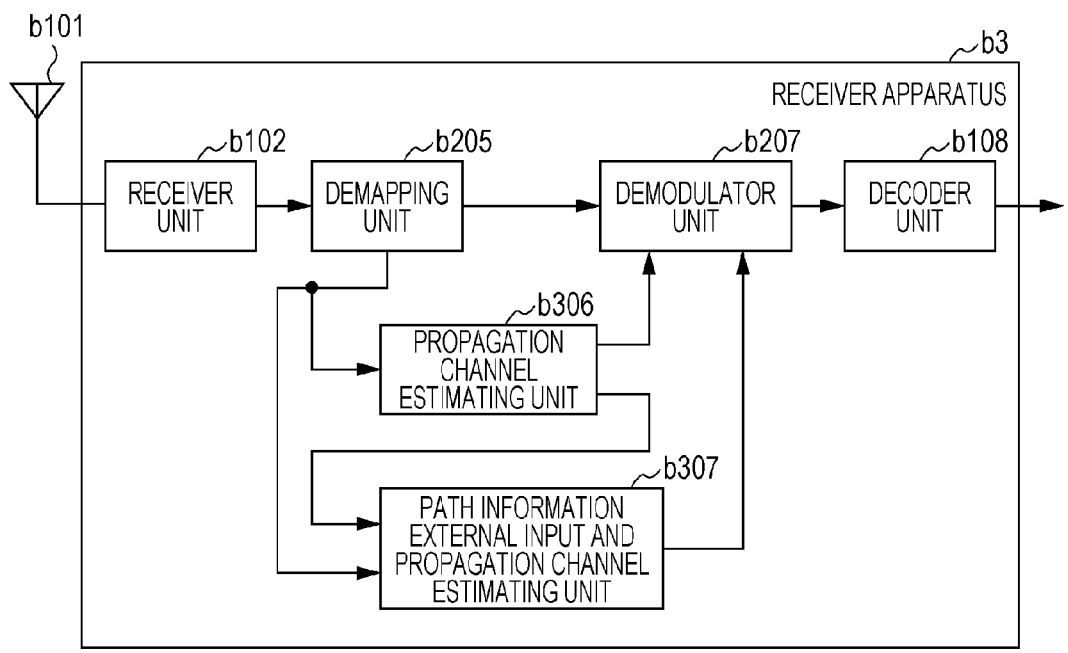
FIG. 24 illustrates a structure example of the receiver apparatus of the third embodiment that is based on the transmitter apparatus a2 of the second embodiment.

A receiver apparatus based on the transmitter apparatus a2 of the second embodiment may be structured as illustrated in FIG. 24.

Fourth Embodiment

A fourth embodiment of the present invention is described in detail with reference to the drawings. In the above discussion, the path information external input and propagation channel estimating unit b307 performs the propagation channel estimation process in the frequency domain in the third embodiment. In the present embodiment, the propagation channel estimation process is performed in the time domain in response to path information input from the outside.

Since a transmitter apparatus a4 of the present embodiment is identical in structure to the transmitter apparatus a1 of the first embodiment or the transmitter apparatus a2 of the second embodiment, the discussion thereof is omitted herein. The following discussion focuses on the use of the transmitter apparatus a1, but is also applicable to the use of the transmitter apparatus a2.

Figure 25:
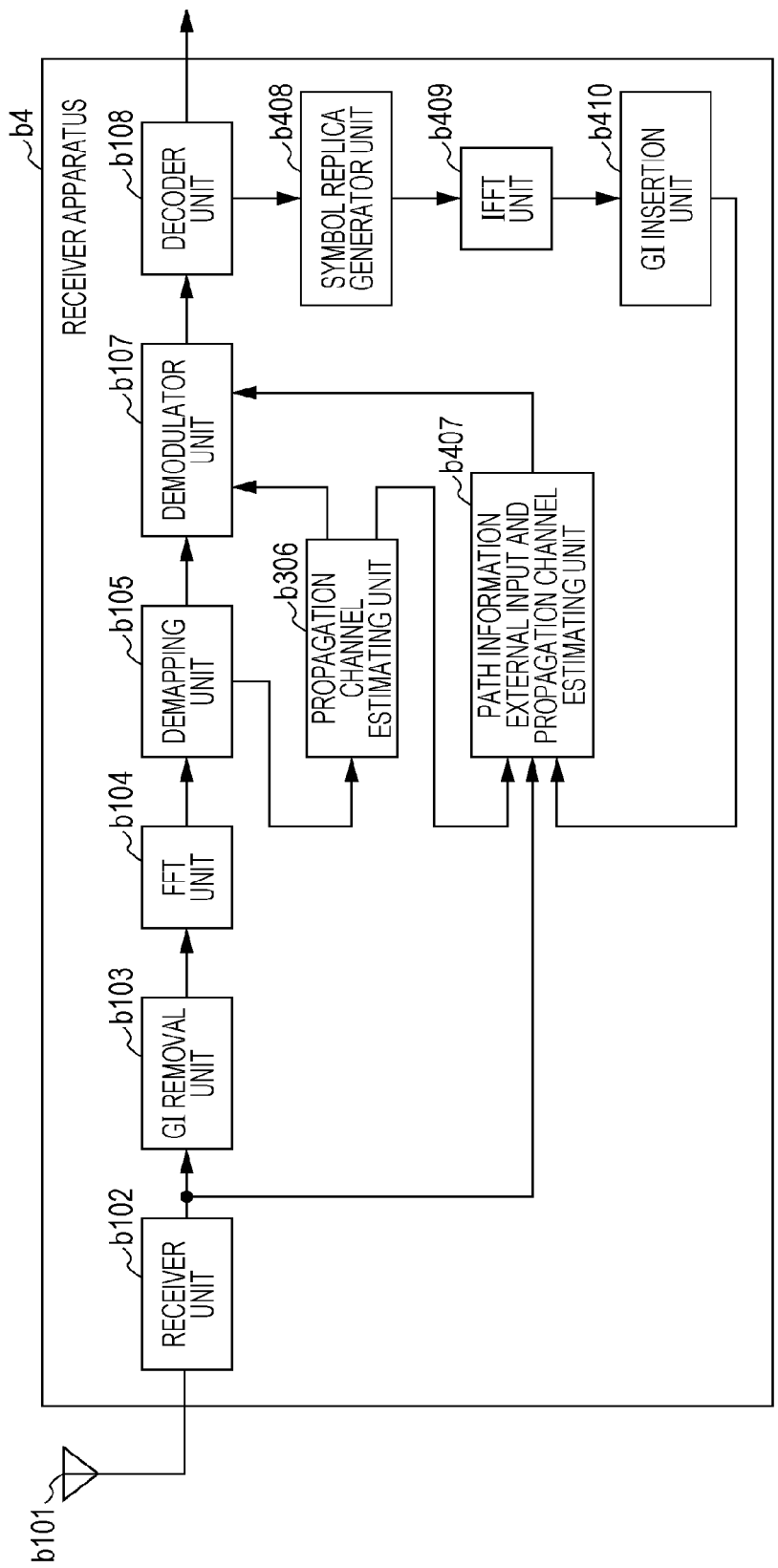
FIG. 25 is a general block diagram illustrating the structure of a receiver apparatus b4 of a fourth embodiment of the present invention.

FIG. 25 is a general block diagram illustrating a structure of a receiver apparatus b4 of the fourth embodiment of the present invention. If the receiver apparatus b4 of the present embodiment (FIG. 25) is compared with the receiver apparatus b3 of the third embodiment (FIG. 22), the path information external input and propagation channel estimating unit b407 has a different process, and a symbol replica generator unit b408, an IFFT unit b409, and a GI insertion unit b410 are added in the receiver apparatus b4.

The functions of the other elements (the receiving antenna unit b101, the receiver unit b102, the GI removal unit b103, the FFT unit b104, the demapping unit b105, the demodulator unit b107, the decoder unit b108, and the propagation channel estimating unit b306) are identical to those of the counterparts in the third embodiment. The discussion of the same functions as those of the third embodiment is omitted herein.

The path information external input and propagation channel estimating unit b407 performs the propagation channel estimation process in the time domain, using the path information output from the propagation channel estimating unit b306 and the received signal in the time domain output from the receiver unit b102. The reference signals then used are a pilot symbol, and determined data fed back from the decoder unit b108. The reference signal is output from the GI insertion unit b410. The operational principle of the process is described below.

The decoder unit b108 outputs LLR of encoded bits to the symbol replica generator unit b408.

The symbol replica generator unit b408 converts the output from the decoder unit b108 into a symbol replica.

The IFFT unit b409 frequency-time transforms the output from the symbol replica generator unit b408 into a replica in the time domain.

The GI insertion unit b410 inserts a guard interval into the output from the IFFT unit b409, and then outputs the resulting signal as a transmission signal replica in the time domain to the path information external input and propagation channel estimating unit b407.

<Operation Principle>

The operation principle of the path information external input and propagation channel estimating unit b407 in the receiver apparatus b4 is described below. Described herein is a time domain estimation process using RLS (Recursive Least Squares) algorithm. In the same manner as in the second embodiment, the estimation process is performed from discrete time $D_q$ to discrete time (K−1). If the RLS algorithm is used, an estimation value is determined at each discrete time. More specifically, the channel impulse responses at discrete times k=3 to 11 are estimated as illustrated in FIG. 19. Let $h_q(k)$ represent a channel impulse response estimation vector at a detection path q at discrete time k, the following Expressions (31)-(35) hold.

[Expressions 22]

$$h_q(k) = w_q^*(k) \quad (31)$$

$$w_q(k) = w_q(k-1) + k_q(k)e_q^*(k) \quad (32)$$

$$k_q(k) = \frac{\lambda^{-1}R_q^{-1}(k-1)u_q(k)}{1+\lambda^{-1}u_q^H(k)R_q^{-1}(k-1)u_q(k)} \quad (33)$$

$$R_q^{-1}(k) = \lambda^{-1}R_q^{-1}(k-1) - \lambda^{-1}k_q(k)u_q^H(k)R_q^{-1}(k-1) \quad (34)$$

$$e_q(k) = r_k - w_q^H(k-1)u_q(k) \quad (35)$$

Here, $\lambda$ ($0<\lambda\leq 1$) represents a forgetting factor, and $u_q(k)$ represents a column vector resulting from transposing a k-th row vector of $S_q$ expressed by Expression (29) or other Expressions. The smaller $\lambda$ is, the more the tracking performance to variations in the propagation channel increases. In the assignment of a value to actually used $\lambda$, the receiver apparatus b4 measures variations in the propagation channel, and then assigns an optimum representative value to $\lambda$. An initial value of $w_q(k)$ is a zero vector, and an initial value of $R_q^{-1}(k)$ is $\gamma I_{|q|}$. The value of $\gamma$ may be an appropriate small value or may be the value of $\alpha$ used when the propagation channel estimating unit b306 detects a path. In FIG. 19, the initial value means a value at discrete time 3.

If the time-domain estimation, such as the RLS algorithm, is used, the receiver apparatus follows the propagation channel that varies in time as described above. On the other hand, path detection is concurrently performed, and processing becomes complex and difficult. In accordance with the present embodiment, however, the path information may be received from the outside, and the path detection can be performed.

In the above discussion, the RLS algorithm is used in the fourth embodiment. Another algorithm, such as LMS (Least Mean Square) algorithm, applicable in the time domain may be used, or the method described with reference to the second embodiment may be used.

In the above discussion, the output of the demodulator unit is fed back in the fourth embodiment. The feedback operation may not be performed. In such a case, the path information external input and propagation channel estimating unit b407 has two input lines, one receiving the received signal in the time domain output from the receiver unit b102 and the other receiving the path information output from the propagation channel estimating unit b306.

Figure 26:
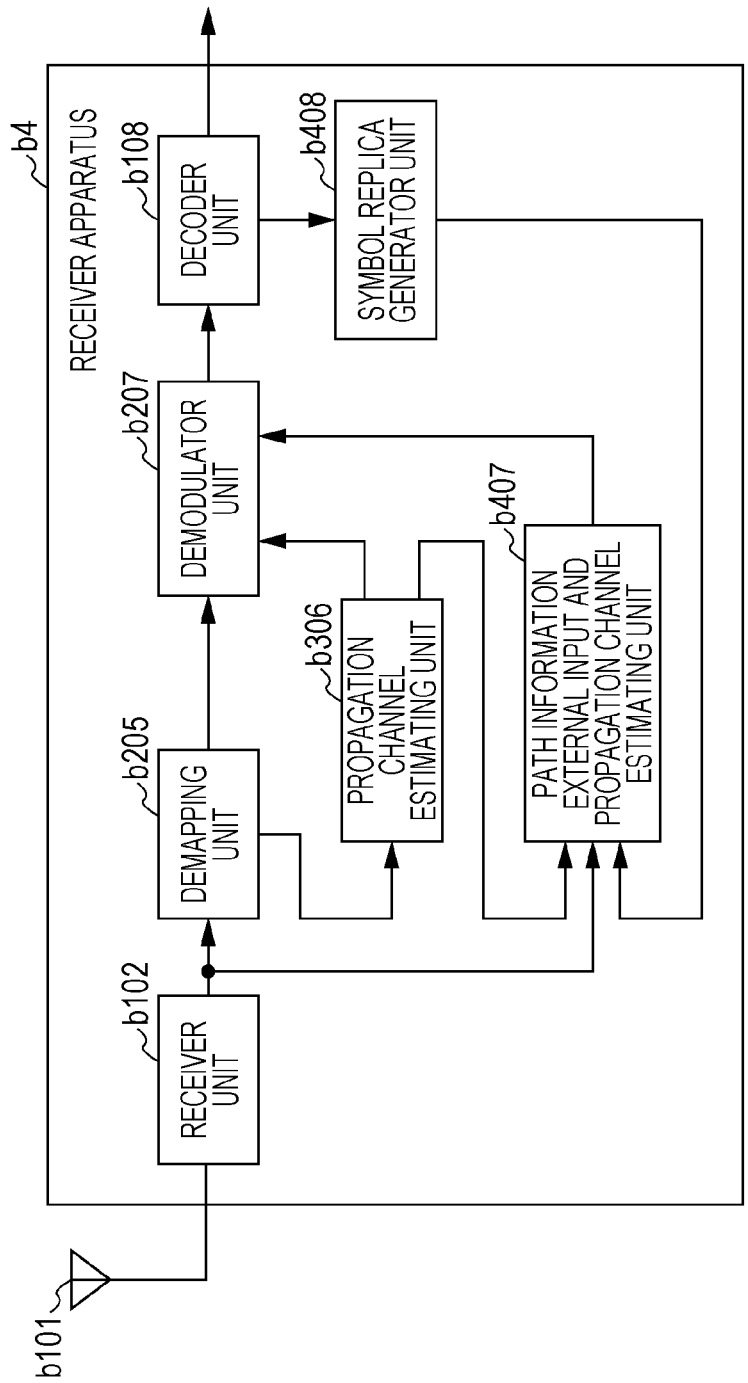
FIG. 26 illustrates a structure example of the receiver apparatus of the fourth embodiment that is based on the transmitter apparatus a2 of the second embodiment.

A receiver apparatus based on the transmitter apparatus a2 of the second embodiment has a structure of FIG. 26.

Part of the transmitter apparatuses a1 and a2, and the receiver apparatuses b1 through b4 in the above embodiments, for example, the propagation channel estimating unit b106 and the demodulator unit b107, may be implemented using a computer. In such a case, a program to implement the control function may be executed by recording the program on a computer readable recording medium, and reading the program recorded on the recording medium onto the computer system.

The term "computer system" refers to a computer system built into one of the transmitter apparatuses a1 and a2, and the receiver apparatuses b1 through b4, and includes an OS and hardware such as a peripheral device. The term "computer readable recording medium" refers to a portable medium, such as a flexible disk, a magneto-optical disk, ROM, or CD-ROM, or a recording device, such as a hard disk, built into the computer system. The "computer readable recording medium" may include a communication line that holds dynamically temporarily the program. The communication line transmits the program via a communication channel such as a network like the Internet or a telephone line. The "computer readable recording medium" may also include a volatile memory in the computer system that may be a server or a client and stores the program for a predetermined period of time. The program may implement part of the above-described function. The part of the above-described function may be used in combination with a program previously recorded on the computer system.

Part or whole of the transmitter apparatuses a1 and a2, and the receiver apparatuses b1 through b4 in the above embodiments, may be implemented as an integrated circuit such as LSI (Large Scale Integration). The function blocks of the transmitter apparatuses a1 and a2, and the receiver apparatuses b1 through b4 may be individually implemented using processors, and part or whole of the function blocks may be integrated into a processor. The technique of integration is not limited to LSI. A dedicated circuit or a general-purpose processor may be employed. If a technique of circuit integration replacing the LSI appears with the advance of semiconductor technique, an integrated circuit resulting from the technique may also be used.

The embodiment of the present invention has been described in detail with reference to the drawings. The specific structure of the embodiment is not limited to the structure described above. A variety of design changes is assumed without departing from the scope of the present invention.

INDUSTRIAL APPLICABILITY

The present invention finds applications in communication apparatuses.

REFERENCE SIGNS LIST a101 Pilot generator unit
a102 Encoder unit
a103 Modulator unit
a104 Mapping unit
a105 IFFT unit
a106 GI insertion unit
a107 Transmitter unit
a108 Antenna unit
b101 Antenna unit
b102 Receiver unit
b103 GI removal unit
b104 FFT unit
b105 Demapping unit
b106 Propagation channel estimating unit
b106-1 Frequency response estimating unit
b106-2 Path detector unit
b106-3 FFT unit
b107 Demodulator unit
b108 Decoder unit All the publication, patents and patent applications cited in this specification are incorporated by reference herein.

The invention claimed is:

1. A receiver apparatus comprising a propagation channel estimating unit that estimates a propagation channel,
wherein the propagation channel estimating unit includes a path detector unit that repeatedly performs a process of detecting paths in the order of increase of a propagation channel goodness of fit,
wherein the path detector unit estimates a plurality of channel impulse responses each of which uses selected paths and a candidate path,
calculates the propagation channel goodness of fit of each of the channel impulse responses,
removes the candidate paths of which the propagation channel goodness's of fit are smaller than a pre-calculated channel propagation goodness of fit of a channel impulse response that uses only the selected paths,
moves at least one of the candidate paths in the descending order of the propagation channel goodness's of fit into the selected paths, and
iterates a process of detecting paths that consists of the estimation of the channel impulse response, the calculation of the propagation channel goodness's of fit, and the selection of the candidate paths.

2. The receiver apparatus according to claim 1, wherein the path detector unit repeatedly performs the process of detecting paths until the candidates paths are no longer present.

3. The receiver apparatus according to claim 1, wherein the path detector unit detects paths one by one.

4. The receiver apparatus according to claims 1, wherein the path detector unit uses as the propagation channel goodness of fit a sum of a propagation channel estimated value, an evaluation value of an error of a received signal, and a penalty responsive to an increase in the number of detected paths.

5. The receiver apparatus according to claim 4, wherein the path detector unit calculates the propagation channel goodness of fit based on a physical structure of a reference signal that is used to calculate the propagation channel estimated value.

6. The receiver apparatus according to claim 5, wherein the physical structure is an assignment frequency.

7. The receiver apparatus according to claim 5, wherein the physical structure is a wave shape in time.

8. The receiver apparatus according to claim 4, wherein the path detector unit uses the Akaike information criterion as the propagation channel goodness of fit.

9. The receiver apparatus according to claim 4, wherein the path detector unit uses the Bayesian information criterion as the propagation channel goodness of fit.

10. The receiver apparatus according to claim 4, comprising a path information external input and propagation channel estimating unit that uses, as external information, detected path information,
wherein the path detector unit outputs the path information to the path information external input and propagation channel estimating unit.

11. The receiver apparatus according to claim 10, wherein the path information external input and propagation channel estimating unit estimates a propagation channel in a frequency domain.

12. The receiver apparatus according to claim 10, wherein the path information external input and propagation channel estimating unit estimates a propagation channel in a time domain.

13. A reception method comprising a propagation channel estimating step of estimating a propagation channel,
wherein the propagation channel estimating step includes repeatedly performing a process of detecting paths in the order of increase in a propagation channel goodness of fit,
wherein the path process of detecting paths includes estimating a plurality of channel impulse responses each of which uses selected paths and a candidate path,
calculating the propagation channel goodness of fit of each of the channel impulse responses,
removing the candidate paths of which the propagation channel goodness's of fit are smaller than a pre-calculated channel propagation goodness of fit of a channel impulse response that uses only the selected paths,
moving at least one of the candidate paths in the descending order of the propagation channel goodness's of fit into the selected paths, and
iterating a process of detecting paths that consists of estimating the channel impulse response, calculating the propagation channel goodness's of fit, and selecting the candidate paths.

14. A reception program product stored in a tangible storage medium for causing a computer to perform the reception method of claim 13.

15. A non-transitory computer-readable medium having instructions stored thereon, said instructions are read and executed by a processor for causing the processor to perform the reception method of claim 13.

* * * * *